United States Patent
Kinoe et al.

(10) Patent No.: US 6,469,722 B1
(45) Date of Patent: Oct. 22, 2002

(54) METHOD AND APPARATUS FOR EXECUTING A FUNCTION WITHIN A COMPOSITE ICON AND OPERATING AN OBJECT THEREBY

(75) Inventors: Yohsuke Kinoe, Yokohama; Kohsuke Okamoto, Sagamihara; Naofumi Muranaka; Tsukasa Takemura, both of Yokohama; Minako Matsuda, Zama; Norimasa Uchiyama, Yamato, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/240,215

(22) Filed: Jan. 29, 1999

(30) Foreign Application Priority Data

Jan. 30, 1998 (JP) .......................................... 10-018389

(51) Int. Cl.⁷ ................................................. G06F 3/00
(52) U.S. Cl. ........................ 345/837; 345/810; 345/808
(58) Field of Search .................................. 345/348, 339, 345/145, 354, 352, 347, 977, 357, 837, 764, 856, 810, 840, 808, 854

(56) References Cited

U.S. PATENT DOCUMENTS

| | | | |
|---|---|---|---|
| 4,698,625 A | * 10/1987 | McCaskill et al. ........... 345/157 |
| 5,436,637 A | * 7/1995 | Gayraud et al. ............. 345/116 |
| 5,546,528 A | 8/1996 | Johnston ...................... 345/807 |
| 5,777,616 A | * 7/1998 | Bates et al. .................. 345/837 |
| 5,815,150 A | * 9/1998 | Shimizu ...................... 345/339 |
| 5,986,639 A | * 11/1999 | Ozawa et al. ................ 345/146 |
| 5,990,862 A | * 11/1999 | Lewis .......................... 345/145 |
| 6,111,562 A | * 8/2000 | Downs et al. ............... 345/145 |
| 6,061,057 A | * 9/2000 | Knowlton et al. ........... 345/744 |

FOREIGN PATENT DOCUMENTS

| | | |
|---|---|---|
| JP | 5-258037 | 10/1993 |
| JP | 7-200243 | 8/1995 |

\* cited by examiner

*Primary Examiner*—Ba Huynh
*Assistant Examiner*—Kieu D. Vu
(74) *Attorney, Agent, or Firm*—Scully, Scott, Murphy & Presser; Derek S. Jennings, Esq

(57) ABSTRACT

The present invention is directed to explaining functions with a rich graphical expression even when the number of kinds of functions required for a software increases.

More particularly, a plurality of function areas 201–223 are defined in a composite icon area of the present invention. An appearance image is associated to each function area and, when a mouse pointer comes across a function area, appearance images associated to that function area are displayed as appearance images of a composite icon. A function is also associated to each function area and, when a mouse is clicked on a function area, a function which is associated to that function area is executed. The set of the function area may be changed by changing the size of a composite icon, an operation to switch the group of functions, or selection of an object to be operated upon.

25 Claims, 18 Drawing Sheets

| Area Definition Formula 401 | Area Number 403 |
|---|---|
| Composite Function Group Switching Area | ① |
| Composite Function Area | ② |
| Size Change/Move Area | ③ |

Area Table 400

| A, X1 | Function Name 411 | Function Area Number 413 | Function Area Definition Formula 415 | Image Data 417 | In-area Flag 419 |
|---|---|---|---|---|---|
| | Function A1 | 201 | A1 | Bit map A1 | 0 |
| | Function A2 | 203 | A2 | Bit map A2 | 1 |
| | Function A3 | 205 | A3 | Bit map A3 | 0 |
| | ⋮ | ⋮ | ⋮ | ⋮ | ⋮ |

Composite Function Table 410

| A, X1 | Group Area Definition Formula 431 | Area Number 433 | Function Name 435 | Selected Flag 437 |
|---|---|---|---|---|
| | A | 243 | A-func | 0 |
| | B | 245 | B-func | 1 |
| | C | 247 | C-func | 0 |
| | ⋮ | ⋮ | ⋮ | ⋮ |

Group Switching Table
430

| | Area Definition Formula 451 | Function Name 453 | |
|---|---|---|---|
| Size Change | 251 | func1 | |
| ⋮ | ⋮ | ⋮ | |
| Move | 252 | func5 | |
| ⋮ | ⋮ | ⋮ | |

Size Change/Move Table
450

| Size Change Rate 471 | Division Scheme 473 | Flag 475 |
|---|---|---|
| 0 ~ 0.5 | X1 | 0 |
| 0.5 ~ 1.5 | X2 | 1 |
| more than 1.5 | X3 | 0 |

Division Scheme Decision Table 470

METHOD AND APPARATUS FOR EXECUTING A FUNCTION WITHIN A COMPOSITE ICON AND OPERATING AN OBJECT THEREBY

BACKGROUND OF THE INVENTION

1. Technical Field

This invention relates to a method of operating a GUI (Graphical User Interface) screen of an information processing apparatus and more particularly, to a function selecting method which allows a user to easily indicate execution of different functions.

2. Prior Art

In a software having a conventional GUI, a single icon is assigned a single function and an assigned function is executed by clicking an icon with a mouse.

Thus, as the number of the kinds of functions required for a software increases, the number of icons on the screen increases correspondingly leading to a problem that an area is occupied by the icons while an area for the essential function of a software (main window) is narrowed.

If the size of an icon is reduced in order to solve this problem, the graphic presentation of an icon becomes scanty and makes the content of the function discernible to a user. As a result, a problem is induced in that adoption of many functions leads to deterioration of the operability of an application.

In a system to solve such problems, icons of resembling functions are grouped and displayed on a sub-window (tool pallet), and the tool pallet itself is switched between display and non-display by using a tag as disclosed in PUPA 8-55001 (U.S. Pat No. 5,546,528).

However, because each of a plurality of icons existing on a single tool pallet has a single function assigned in respective icon area, the size of an icon is limited when the number of the kinds of functions increases and it was sometimes difficult to intuitively judge in which tag a desired icon exists.

As a prior art to this invention, there are PUPA5-258037 and PUPA7-200243. In PUPA5-258037, by providing 3 areas on a tool (icon) and selecting and moving an area, the tool may be simply moved and a graphic image may be erased in a broad width or a narrow width.

However, the display (external appearance) of a tool is modified only after an area is selected in this technology so that a problem was accompanied in that the operator was not able to see what function was assigned to each area before the function was executed.

On the other hand, PUPA7-200243 discloses a composite icon which is capable of executing different functions and changing the size. However, because the external appearance is not changed in this technology, this technology was not able to solve a problem that the graphic expression to describe the function became scanty as the number of the kinds of functions required for a software increased.

It is an object of this invention to provide a GUI environment of improved operability which allows each function to be described by a rich graphic expression even when the number of the kinds of functions required for a software increases.

It is another object of this invention to improve the user operability of a software by grouping a plurality of functions intimately related to a user in an icon area which is expressed by a single appearance image.

It is a further object of this invention to enlarge an area occupied by a main window by allocating a plurality of functions to a single icon to reduce the number of icons on the screen.

It is a further object of this invention to provide a GUI environment which is capable of preventing an erroneous operation by a user beforehand by changing the entire appearance (or a part of appearance) of an icon depending on the position of a mouse pointer on the icon and explicitly notifying the operator of a function which is to be executed when clicked in that position before the function is executed.

It is a still further object of this invention to provide a GUI environment of a high operability which allows an operator to freely set an appearance corresponding to each function area to a size which is identifiable to the operator by enabling the operator to enlarge or reduce an icon area.

It is a further object of this invention to provide a GUI environment which allows an operator to dynamically select a function group which the operator desires.

It is a further object of this invention to provide a GUI environment which allows an operator to dynamically select a function of a kind which is related to an icon area.

It is a still further object of this invention to provide an image processing system which is intuitively understandable to an operator.

SUMMARY OF THE INVENTION

A plurality of function areas are defined in an area of a composite icon of this invention. Each function area is associated with an appearance image which is displayed as an appearance image of the composite icon when a mouse pointer comes across a function area. In addition, each function area is associated with respective function which is executed when a mouse is clicked in a function area. In a mode of this invention, setting of the function area may be changed by changing the size of the composite icon, by an operation to switch a group of functions or by selecting an object to be operated upon.

In one mode of this invention, on a display of an information processing apparatus which is provided with a display and a pointing device, a method is provided for selecting a function using a pointer of said pointing device in an icon area comprising a first function area which is correlated to a first function and a first appearance image and a second function area which is correlated to a second function and a second appearance image, the method comprising the steps of;

(a) checking whether or not said pointer is on said first function area, (b) displaying said first appearance image in an area which is at least a part of said icon area including said first function area and said second function area when said pointer is on said first function area, (c) checking whether or not said pointer is on said second function area, (d) displaying said second appearance image in an area which is at least a part of said icon area including said first function area and said second function area when said pointer is on said second function area, (e) determining whether or not an operation to select said second function area has been performed by an operator, and (f) executing said second function when the operation to select said second function area has been performed by the operator In the claims of this invention, the term "pointing device" is a concept including a touch panel in which a finger corresponds to the pointer. Incidentally, the pointer is described as an object to be operated upon in the claims of this invention and is not a component of this invention. Also, the phrase "operation to select a function area" as used in the claims of this invention is a concept including not only "mouse clicking on a function area" but also every operations in which a user selects a function area such as a selection by a tab key, a direction key and an enter key, etc.

In another mode of this invention, on a display of an information processing apparatus which is provided with a display and a pointing device, a method is provided for selecting a function using a pointer of said pointing device in an icon area comprising a first function area which is correlated to a first function and a first appearance image and a second function area which is correlated to a second function and a second appearance image, the method comprising the steps of;

(a) checking whether or not said pointer is on said first function area,
(b) displaying said first appearance image in an area which is at least a part of said icon area including said first function area and said second function area when said pointer is on said first function area,
(c) checking whether or not said pointer is on said second function area,
(d) displaying said second appearance image in an area which is at least a part of said icon area including said first function area and said second function area when said pointer is on said second function area,
(e) determining whether or not an operation to change the size of said icon area has been performed by an operator,
(f) changing the size of said first function area, said second function area and said icon area in response to the operation to change the size,
(g) determining whether or not an operation to select the second function area the size of which has been changed has been performed by an operator, and
(h) executing said second function when the operation to select said second function area the size of which has been changed has been performed by the operator.

In the claims of this invention, the phrase "operation after the size of the icon area has been changed" is a concept including not only "operation of changing the size or drag and release operation of an area moved" but also every operations in which the operator changes the size of the icon area, such as an input of a numeric value by a keyboard, etc.

In another mode of this invention, on a display of an information processing apparatus which is provided with a display and a pointing device, a method is provided for selecting a function using a pointer of said pointing device in an icon area comprising a first function area which is correlated to a first function and a first appearance image and a second function area which is correlated to a second function and a second appearance image, the method comprising the steps of;

(a) checking whether or not said pointer is on said first function area,
(b) displaying said first appearance image in an area which is at least a part of said icon area including said first function area and said second function area when said pointer is on said first function. area,
(c) checking whether or not said pointer is on said second function area,
(d) displaying said second appearance image in an area which is at least a part of said icon area including said first function area and said second function area when said pointer is on said second function area,
(e) determining whether or not an operation to change the size of said icon area has been performed by an operator,
(f) determining whether or not the change of the size meets a predetermined condition,
(g) having a third function area which was not included in said icon area before the size was changed and is correlated to a third function and a third appearance image included in the icon area the size of which has been changed when the change of the size meets the predetermined condition,
(h) determining whether or not an operation to select the third function area has been performed by an operator, and
(i) executing said third function when the operation to select said third function area has been performed by the operator.

In another mode of this invention, on a display of an information processing apparatus which is provided with a display and a pointing device, a method is provided for selecting a function using a pointer of said pointing device in an icon area comprising a first function area which is correlated to a first function and a first appearance image and a second function area which is correlated to a second function and a second appearance image, the method comprising the steps of;

(a) checking whether or not said pointer is on said first function area,
(b) displaying said first appearance image in an area which is at least a part of said icon area including said first function area and said second function area when said pointer is on said first function area,
(c) checking whether or not said pointer is on said second function area,
(d) displaying said second appearance image in an area which is at least a part of said icon area including said first function area and said second function area when said pointer is on said second function area,
(e) determining whether or not an operation to indicate the change a function group has been performed by an operator,
(f) having a third function area which was not included in said icon area before the operation to indicate the change of the function group was performed and is correlated to a third function and a third appearance image and a fourth function area which was not included in said icon area before the operation to indicate the change of the function group was performed and is correlated to a fourth function and a fourth appearance image included in the icon changed area when the operation to indicate the change of the function group was performed by the operator,
(g) determining whether or not said pointer is on said third function area,
(h) displaying said third appearance image in an area which is at least a part of said icon area and includes said third function area and said fourth function area when said pointer is on said third function area,
(i) determining whether or not said pointer is on said fourth function area,
(j) displaying said fourth appearance image in an area which is at least a part of said icon area and includes said third function area and said fourth function area when said pointer is on said fourth function area, (k) determining whether or not an operation to select said fourth function area has been performed by the operator, and (l) executing said fourth function when the operation to select said fourth function area has been performed by the operator.

In the claims of this invention, the phrase "operation to indicate the change of the function group" is a concept including not only "drag and release the size change/move area to a composite function area of the group switching area or drag and release of a moved area", "click the group switching area" and "selection of other object having different property value" but also every operations in which the operator changes the function group such as a keyboard input, etc.

In another mode of this invention, on a display of an information processing apparatus which is provided with a display and a pointing device, a method is provided for operating on an object using a pointer of said pointing device in an icon area comprising a first function area which is correlated to a first function and a first appearance image and a second function area which is correlated to a second function and a second appearance image, said first function converting an object displayed on the display by a first logical function and displaying the converted object, said second function converting an object displayed on the display by a second logical function and displaying the converted object, said first appearance image suggesting said first logical function, said second appearance image suggesting said second logical function, the method comprising the steps of;

(a) checking whether or not said pointer is on said first function area, (b) displaying said first appearance image in an area which is at least a part of said icon area and includes said first function area and said second function area when said pointer is on said first function area, (c) checking whether or not said pointer is on said second function area, (d) displaying said second appearance image in an area which is at least a part of said icon area and includes said first function area and said second function area when said pointer is on said second function area, (e) determining whether or not an operation to select said second function area has been performed by an operator, and (f) converting said object by said second logical function and displaying the converted object by executing said second function when the operation to select said second function area has been performed by an operator.

In still another mode of this invention, on a display of an information processing apparatus which is provided with a display and a pointing device, a method is provided for operating on an object using a pointer of said pointing device in an icon area comprising a first function area which is correlated to a first function and a first appearance image and a second function area which is correlated to a second function and a second appearance image, said first function changing the property of an object displayed on the display to a first value and displaying the changed property, said second function changing said property to a second value and displaying the changed property, the method comprising the steps of;

(a) checking whether or not said pointer is on said first function area, (b) displaying said first appearance image in an area which is at least a-part of said icon area and includes said first function area and said second function area when said pointer is on said first function area, (c) checking whether or not said pointer is on said second function area, (d) displaying said second appearance image in an area which is at least a part of said icon area and includes said first function area and said second function area when said pointer is on said second function area, (e) determining whether or not an operation to select said second function area has been performed by an operator, and (f) changing said property to said second value and displaying the changed property by executing said second function when the operation to select said second function area has been performed by an operator.

In still another mode of this invention, an information processing apparatus is provided which is provided with a display and a pointing device and allows a function to be selected using a pointer of said pointing device in an icon area comprising a first function area which is correlated to a first function and a first appearance image and a second function area which is correlated to a second function and a second appearance image, said apparatus comprising;

(a) an input part for checking on which of said first and said second function areas said pointer is, (b) a function storage part for storing said first and said second functions, (c) an appearance image data storage part for storing said first and said second appearance images, (d) a function decision table for correlating said first function area to said first function and said second function area to said second function, (e) an appearance image decision table for correlating said first function area to said first appearance image and said second function area to said second appearance image, (f) an event detection part for detecting that an operation to select said first or said second function area has been performed, and (g) a function execution part for executing said first or said second function.

In a further mode of this invention, an information processing apparatus is provided which is provided with a display and a pointing device. and allows a function to be selected using a pointer of said pointing device in an icon area comprising a first function area which is correlated to a first function and a first appearance image and a second function area which is correlated to a second function and a second appearance image, said apparatus comprising; (a)

(a) a determination part;

(a1) for searching an appearance image decision table which correlates said first function area to said first appearance image and said second function area to said second appearance image in response to a determination of on which of said first and said second function areas said pointer is, accessing to an appearance image data storage part storing said first and said second appearance images to specify appearance image data to be displayed in said icon area, and (a2) for searching a function decision table which correlates said first function area to said first function and said second function area to said second function in response to a determination of on which of said first and said second function areas an operation indicating to select has been performed, accessing to a function storage part storing said first and said second functions to specify a function to be executed, and (b) a function execution part for executing said specified function.

In a further mode of this invention, on a display of an information processing apparatus is provided with a display and a pointing device, a recording medium storing a control program is provided for selecting a function using a pointer of said pointing device in an icon area comprising a first function area which is correlated to a first function and a first appearance image and a second function area which is correlated to a second function and a second appearance image, said control program comprising;

(a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area including said first function area and said second function area when said pointer is on said second function area, (e) a program code for instructing said information processing apparatus to determine whether or not an operation to select said second function area has been performed by an operator, and (f) a program code for instructing said information processing apparatus to execute said second function when the operation to select said second function area has been performed by the operator.

In a further mode of this invention, on a display of an information processing apparatus is provided with a display and a pointing device, a recording medium storing a control program is provided for selecting a function using a pointer of said pointing device in an icon area comprising a first function area which is correlated to a first function and a first appearance image and a second function area which is correlated to a second function and a second appearance image, said control program comprising;

(a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area including said first function area and said second function area when said pointer is on said second function area, (e) a program code for instructing said information processing apparatus to determine whether or not an operation to change the size of said icon area has been performed by an operator, (f) a program code for instructing said information processing apparatus to change the size of said first function area, said second function area and said icon area in response to the operation to change the size, (g) a program code for instructing said information processing apparatus to determine whether or not an operation to select the second function area the size of which has been changed has been performed by an operator, and (h) a program code for instructing said information processing apparatus to execute said second function when the operation to select said second function area the size of which has been changed has been performed by the operator.

In a further mode of this invention, on a display of an information processing apparatus is provided with a display and a pointing device, a recording medium storing a control program is provided for selecting a function using a pointer of said pointing device in an icon area comprising a first function area which is correlated to a first function and a first appearance image and a second function area which is correlated to a second function and a second appearance image, said control program comprising;

(a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area including said first function area and said second function area when said pointer is on said second function area, (e) a program code for instructing said information processing apparatus to determine whether or not an operation to change the size of said icon area has been performed by an operator, (f) a program code for instructing said information processing apparatus to determine whether or not the change of the size meets a predetermined condition, (g) a program code for instructing said information processing apparatus to have a third function area which was not included in said icon area before the size was changed and is correlated to a third function and a third appearance image included in the icon area the size of which has been changed when the change of the size meets the predetermined condition, (h) a program code for instructing said information processing apparatus to determine whether or not an operation to select the third function area has been performed by an operator, and (i) a program code for instructing said information processing apparatus to execute said third function when the operation to select said third function area has been performed by the operator.

In a still further mode of this invention, on a display of an information processing apparatus is provided with a display and a pointing device, a recording medium storing a control program is provided for selecting a function using a pointer of said pointing device in an icon area comprising a first function area which is correlated to a first function and a first appearance image and a second function area which is correlated to a second function and a second appearance image, said control program-comprising;

(a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least apart of said icon area including said first function area and said second function area when said pointer is on said second function area, (e) a program code for instructing said information processing apparatus to determine whether or not an operation to indicate the change a function group has been performed by an operator, (f) a program code for instructing said information processing apparatus to have a third function area which was not included in said icon area before the operation to indicate the change of the function group was performed and is correlated to a third function and a third appearance image and a fourth function area which was not included in said icon area before the operation to indicate the change of the function group was performed and is correlated to a fourth function and a fourth appearance image included in the changed icon area when the operation to indicate the change of the function group was performed by the operator, (g) a program code for instructing said information processing apparatus to determine whether or not said pointer is on said third function area, (h) a program code for instructing said information processing apparatus to display said third appearance image in an area which is at least a part of said icon area and includes said third function area and said fourth function area when said pointer is on said third function area, (i) a program code for instructing said information processing apparatus to determine whether or not said pointer is on said fourth function area, (j) a program code for instructing said information processing apparatus to display said fourth appearance image in an area which is at least a part of said icon area and includes said third function area and said fourth function area when said pointer is on said fourth function area, (k) a program code for instructing said information processing apparatus to determine whether or not an operation to select said fourth function area has been performed by the operator, and (1) a program code for instructing said information processing apparatus to execute said fourth function when the operation to select said fourth function area has been performed by the operator.

In a still further mode of this invention, on a display of an information processing apparatus which is provided with a display and a pointing device, a recording medium storing a control program is provided for operating on an object using a pointer of said pointing device in an icon area comprising a first function area which is correlated to a first function and a first appearance image and a second function area which is correlated to a second function and a second appearance image, said first function converting an object displayed on the display by a first logical function and displaying the converted object, said second function converting an object displayed on the display by a second logical function and displaying the converted object, said first appearance image suggesting said first logical function, said second appearance image suggesting said second logical function, said control program comprising;

(a) a program code for instructing said information processing apparatus to check whether or not said pointer is on said first function area, (b) a program code for instructing said information processing apparatus to display said first appearance image in an area which is at least a part of said icon area and includes said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area and includes said first function area and said second function area when said pointer is on said second function area, (e) a program code for instructing said information processing apparatus to determine whether or not an operation to select said second function area has been performed by an operator, and (f) a program code for instructing said information processing apparatus to convert said object by said second logical function and display the converted object by executing said second function when the operation to select said second function area has been performed by an operator.

In a still further mode of this invention, on a display of an information processing apparatus which is provided with a display and a pointing device, a recording medium storing a control program is provided for operating on an object using a pointer of said pointing device in an icon area comprising a first function area which is correlated to a first function and a first appearance image and a second function area which is correlated to a second function and a second appearance image, said first function changing the property of an object displayed on the display to a first value and displaying the changed property, said second function changing said property to a second value and displaying the changed property, said control program comprising;

(a) a program code for instructing said information processing apparatus to check whether or not said pointer is on said first function area, (b) a program code for instructing said information processing apparatus to display said first appearance image in an area which is at least a part of said icon area and includes said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area and includes said first function area and said second function area when said pointer is on said second function area, (e) a program code for instructing said information processing apparatus to determine whether or not an operation to select said second function area has been performed by an operator, and (f) a program code for instructing said information processing apparatus to change said property to said second value and display the changed property by executing said second function when the operation to select said second function area has been performed by an operator.

In a still further mode of this invention, provided is a recording medium storing data which allows a composite icon to select a function using a pointer of said pointing device on a display of an information processing apparatus which is provided with said display and a pointing device, said composite icon being formed by an icon area comprising a first function area which is correlated to a first function and a first appearance image and a second function area which is correlated to a second function and a second appearance image said recording medium, said medium comprising;

(a) a first function execution module which is an execution module of said first function, (b) a second function execution module which is an execution module of said second function, (c) first appearance image data for displaying said first appearance image, (d) second appearance image data for displaying said second appearance image, (e) a function decision table for correlating said first function area to said first function and said second function area to said second function, and (f) an appearance image decision table for correlating said first function area to said first appearance image and said second function area to said second appearance image.

BRIEF DESCRIPTION OF THE DRAWINGS

Preferred embodiments of the present invention will now be described, by way of example only, with reference to the accompanying drawings in which.

DETAILED DESCRIPTION OF THE PREFERRED EMBODIMENT OF THE PRESENT INVENTION

A. Hardware Configuration

Figure 1:
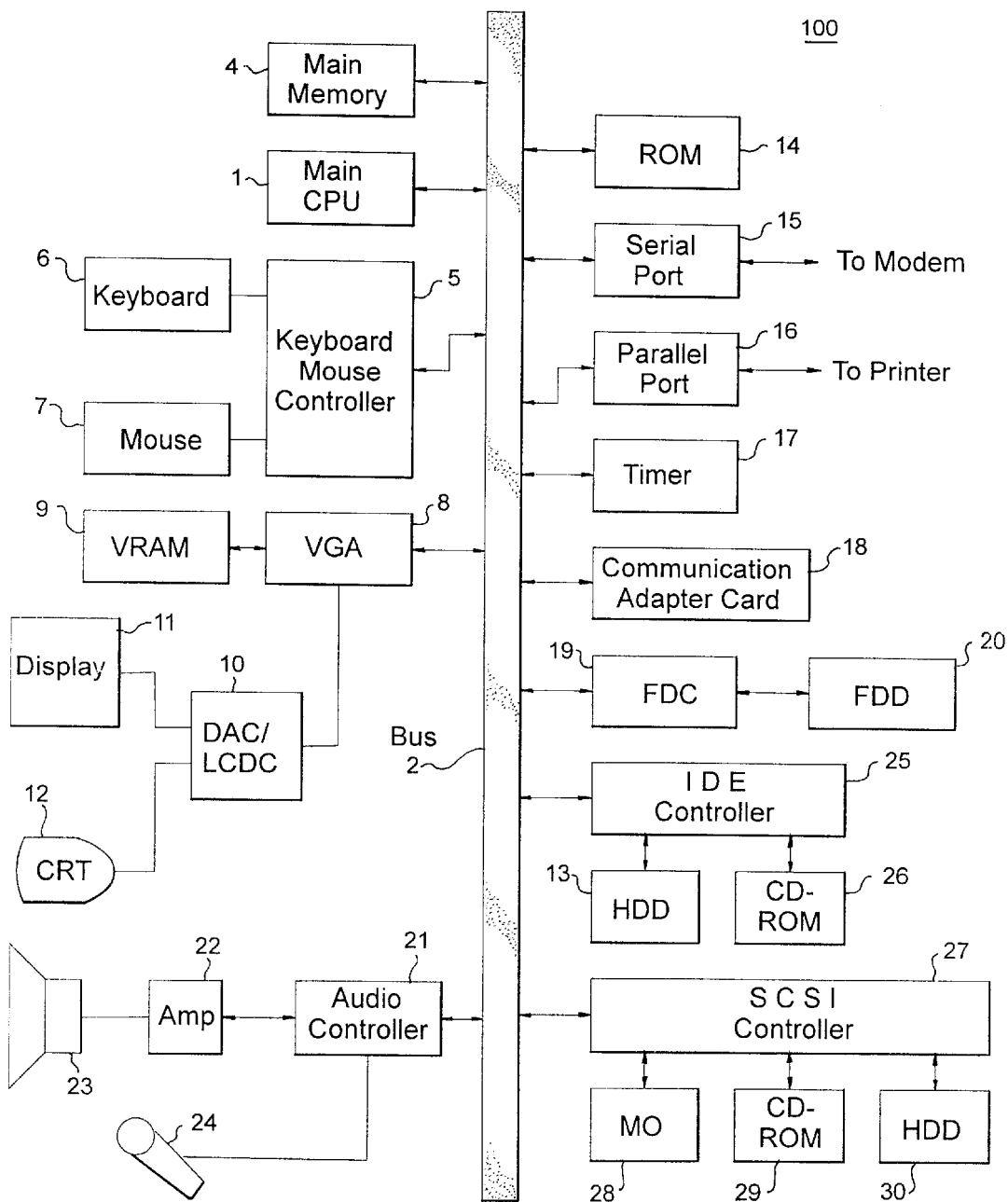
FIG. 1 is a block diagram showing an embodiment of a hardware configuration of an information processing apparatus of this invention.

An embodiment of this invention is now described with reference to the drawings. Referring to FIG. 1, a schematic diagram of an embodiment of a hardware configuration of a data processing apparatus 100 which is used in this invention is shown. The data processing apparatus 100 comprises a central processing unit (CPU) 1 and a memory 4, which are connected via bus 2 to timer 17. The CPU 1 and the main memory 4 are connected to a hard disk device 13 and CD-ROM 26 as auxiliary storage via IDE controller 25 and bus 2. A floppy disk device 20 is connected to the bus 2 through a floppy disk controller 19. Other storage medium driving devices, such as MO 28, CD-ROM 29 and HDD 30, are connected via SCSI Controller 27 and bus 2 to CPU 1 and main memory 4.

A floppy disk device (or a storage medium such as MO and CD-ROM) is inserted in the floppy disk device 20 (or a storage medium driving device such as MO and CD-ROM). A computer program code which gives instructions to the CPU and the like in cooperation with an operating system to practice this invention is recorded in the floppy disk, the hard disk device 13 and the ROM 14 and executed by being loaded in the memory 4. The computer program code may be compressed or divided into a plurality of pieces for storage in a plurality of media.

Further, the information processing apparatus is provided with a user interface hardware, such as a pointing device 7 (a mouse and a joystick) or a keyboard 6 for inputting and a display 12 for presenting visual data to a user.

Further, a printer may be connected via a parallel port 16 and a modem may be connected via a serial port 15. The information processing apparatus 100 can be connected to a network via the serial port 15 and the modem or a communication adapter 18 (Ethernet and token ring cards, etc.) for communication with other computers and the like.

A speaker 23 receives an audio signal from an audio controller 21 via an amplifier 22 for output as a voice. The audio controller 21 A/D (analog/digital) converts voice information received from a microphone 24 to allow voice information external to the system to be taken into the system.

As such, it will be readily understood that the data control system of this invention may be practiced by a conventional personal computer (PC), a workstation, a notebook PC, a palm top PC, a network computer, home electric appliances such as a television set implementing a computer, and a portable information terminal, a game machine, or a combination thereof. It should be noted, however, that these components are given for exemplary purpose and it is not meant that all of these components are the indispensable components of this invention.

The hardware configuration as described here are required for changing the appearance or a function of an icon in response to the operation of a pointing device by a user so that the audio controller 21, the amplifier 22, the speaker 23 and the microphone 24, etc., which are required for processing a voice are not indispensable components. In addition, the keyboard 6, the mouse 7 connected via the keyboard/mouse controller 5, as well as the display device 11 connected via DAC/LCDC 10 to VGA card 8 that utilizes VRAM 11, which are used for presenting visual data to a user are not necessarily required components in a mode of using a remote controlled terminal which outputs output data to a remote terminal based on a signal received from the remote control terminal.

Various modifications of the components of the information processing apparatus, such as combining a plurality of machines and distributing functions thereto, etc., should be easily conceived by those skilled in the art and they are within the concept of this invention.

While an operating system which supports as a standard a GUI (graphic user interface) multi-window environment such as WindowsNT (trademark of Microsoft), Windows95 (trademark of Microsoft), Windows3.x (trademark of Microsoft), OS/2 (trademark of IBM) and X-WINDOW system (trademark of X Consortium) on AIX (trademark of IBM) is preferable, the operating system is not limited to any specific operating system environment.

B. System Configuration

The system configuration in a preferred embodiment of this invention is now described with reference to the block diagram of FIG. 2. In the preferred embodiment of this invention, the information processing apparatus 100 is provided with an input part 101, an event detection part 103, a determination part 105, an execution part 107, a display part 109, an appearance image data storage part 111, an appearance image/function decision table storage part 113 and a function storage part 115.

The input part 101 generates an event such as position data and a mouse clicking from a signal inputted from the pointing device 7. The event detection part 103 detects an event generated from the input part 101. The determination part 105 selects a function to be executed based on an event detected by the event detection part 103. The execution part 107 executes the function selected by the determination part 105 and returns the result of execution to the determination part 105.

The display part 109 obtains image data selected by the determination part 105 to convert it to data which is suitable for display on the screen. The appearance image data storage part 111 stores image data which is to be displayed as an icon corresponding to each function. The function storage part 115 stores a function module to be executed by the information processing apparatus 100. The appearance image/function decision table storage part 113 stores a table which correlates the appearance image data stored in the appearance image data storage part 111 to the function stored in the function storage part 115. In the preferred embodiment of this invention, the input part 101 and the display part 109 are implemented by utilizing a function of an operating system.

Figure 2:
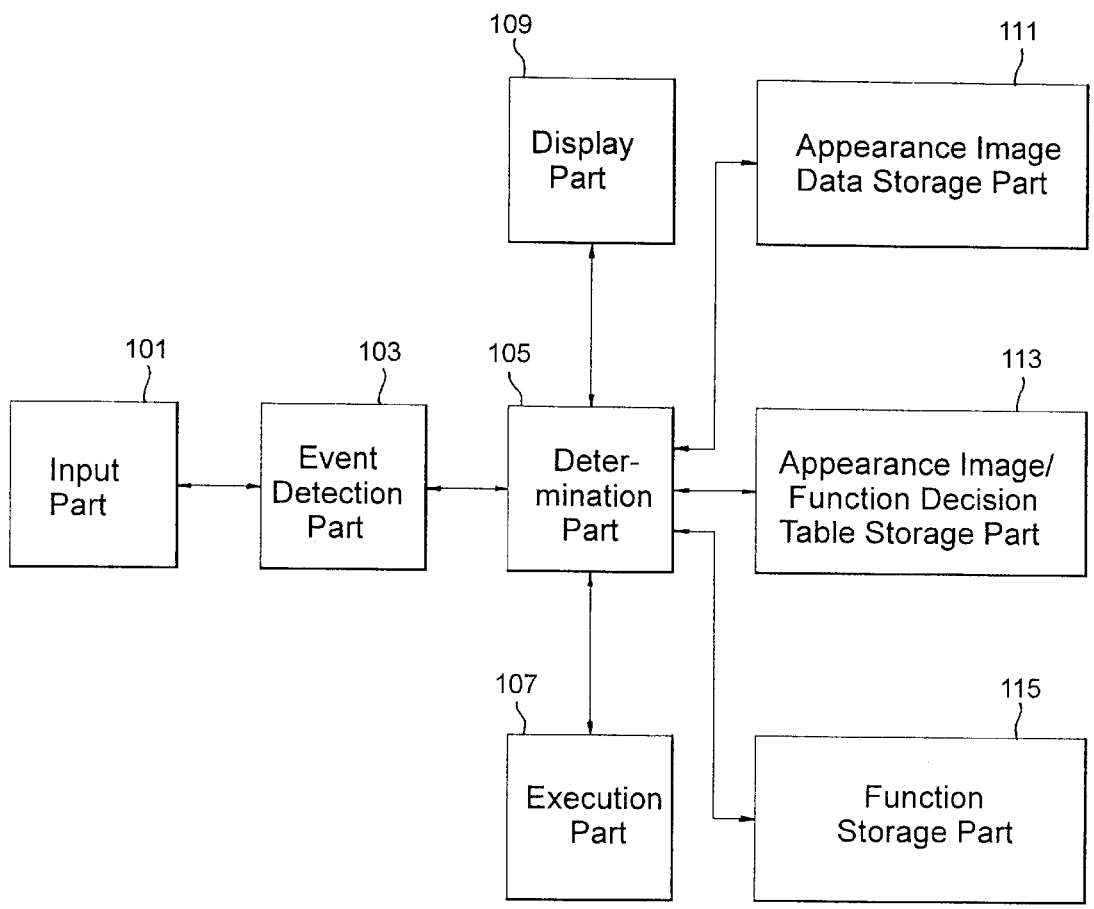
FIG. 2 is a functional block diagram showing a system structure of an information processing apparatus in the preferred embodiment of this invention.

While the functional blocks shown in FIG. 2 have been described in the above, these functional blocks are logical functional blocks each of which is not meant to be implemented by a unitary hardware or software and may be implemented in the form of composite or shared hardwares or softwares. Further, it is not meant that all functional blocks are indispensable components to this invention.

For example, in a mode using a remote control terminal performing a mouse input and an image output and a remote controlled terminal which outputs image data to the remote control terminal based on a signal received from the remote control terminal, the input part 101 and the display part 109 may dispose other functional blocks in the side of the remote control terminal. Also, some or all of the appearance image data storage part 111, the appearance image/function decision table storage part 113 and the function storage part 115 may be disposed in another machine.

C. Operation of Composite Icon

C-1. Function Area/Group Switching Area

Next, the function area and the group switching area of the composite function icon in the preferred embodiment of this invention are now described.

Figure 3:
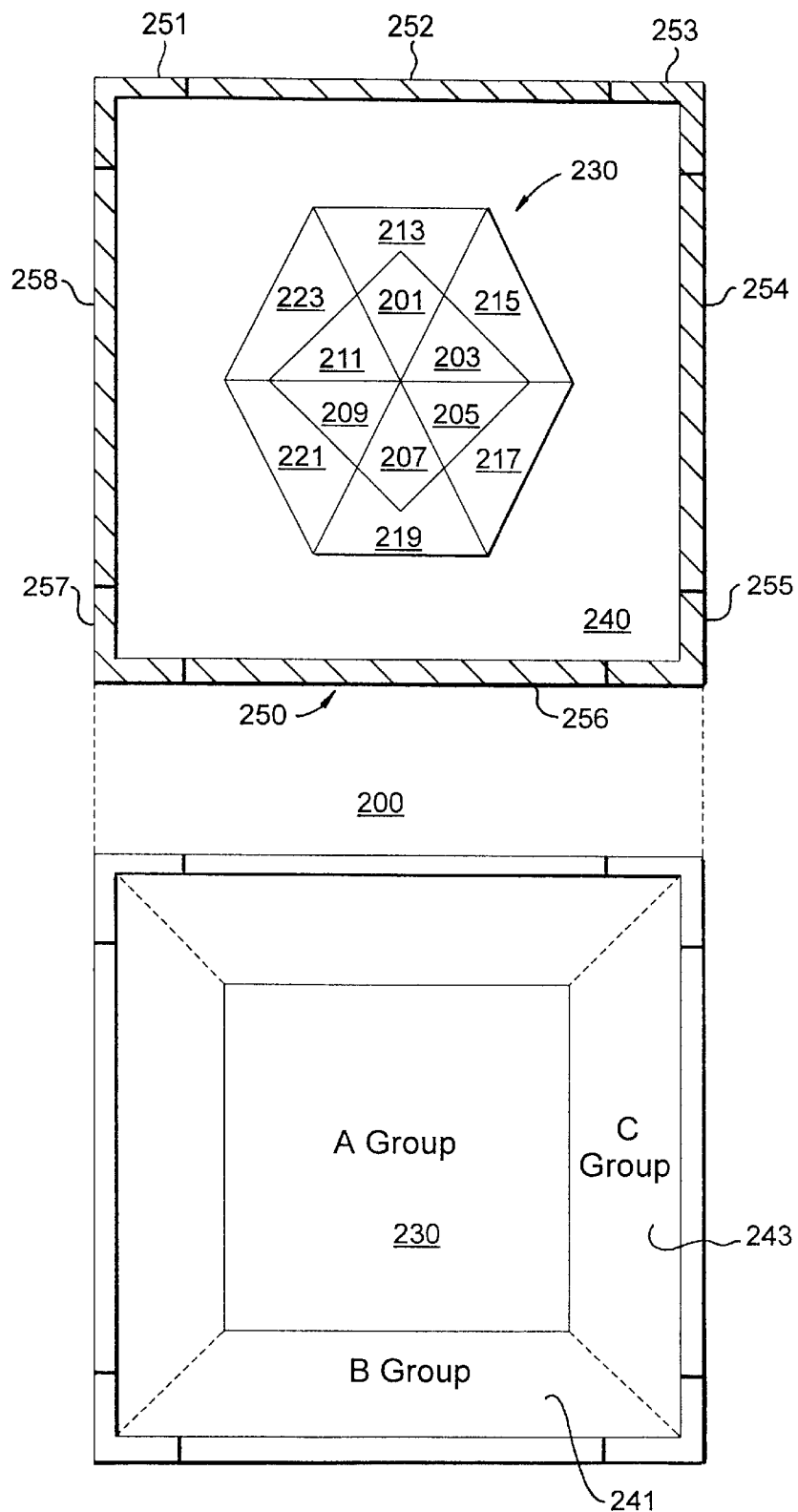
FIG. 3 is a schematic diagram showing the structure of an icon area in the preferred embodiment of this invention.

As shown in FIG. 3, the icon area of the composite function icon of the preferred embodiment of this invention generally comprises 3 areas including a composite function area 230, a composite group switching area 240 and a size change/move area 250.

Figure 5:
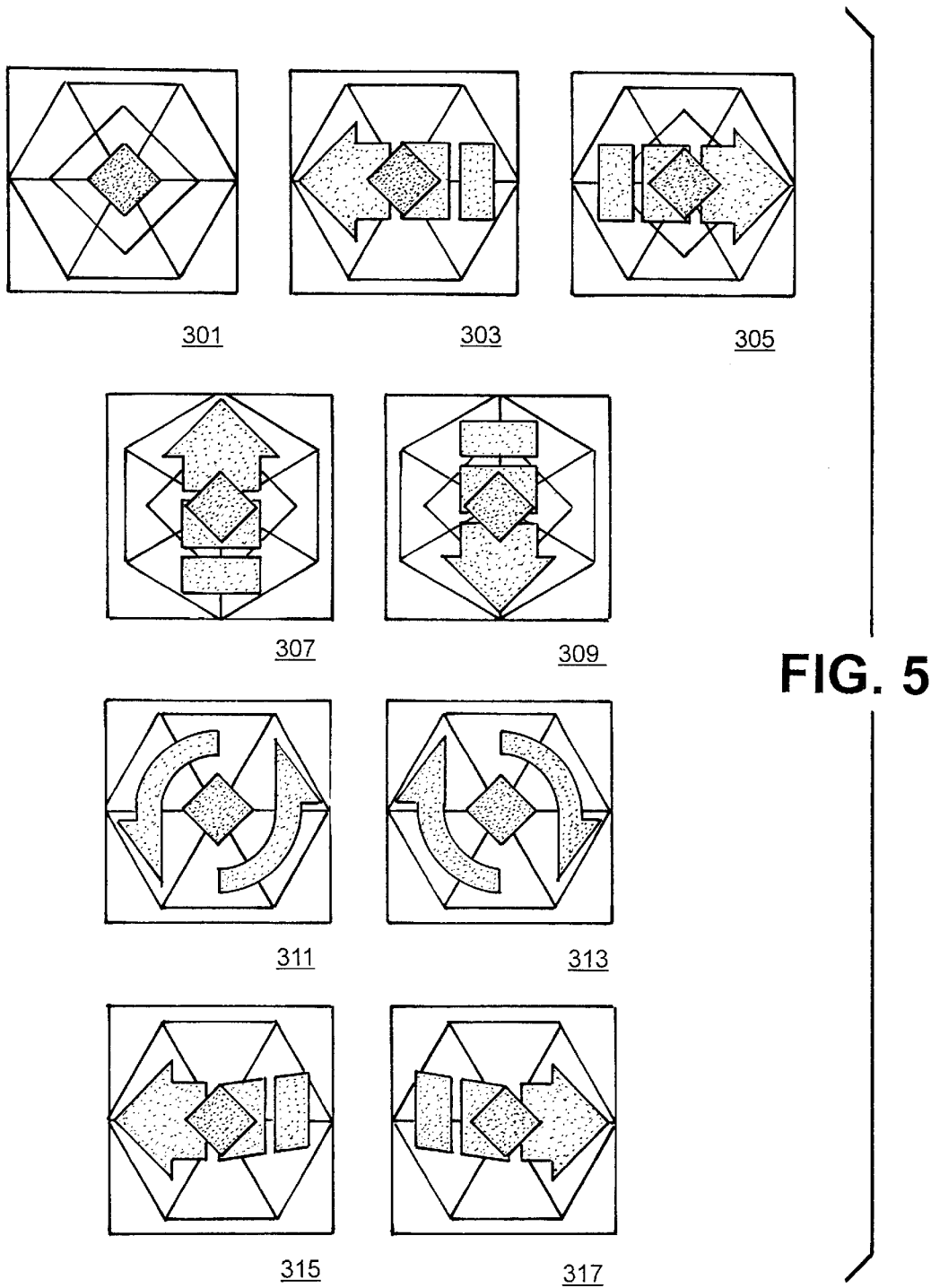
FIG. 5 is a chart illustrating appearance images allocated to function areas in the preferred embodiment of this invention.

The composite function area 230 comprises a plurality of function areas 201–223, each of which is assigned a corresponding function and, when an event of a mouse clicking is generated in an area, a corresponding function will be executed. Also, when a mouse pointer lies on a function area, the icon area 200 is replaced with an image corresponding to that function area. FIG. 5 shows an example of appearance image data allocated to each function area.

In the preferred embodiment of this invention, the composite function group can be switched to another composite function group. Each of the group switching areas 241, 243 contained in the composite group switching area 240 is allocated a function to switch from a composite function group to another composite function group.

Figure 4:
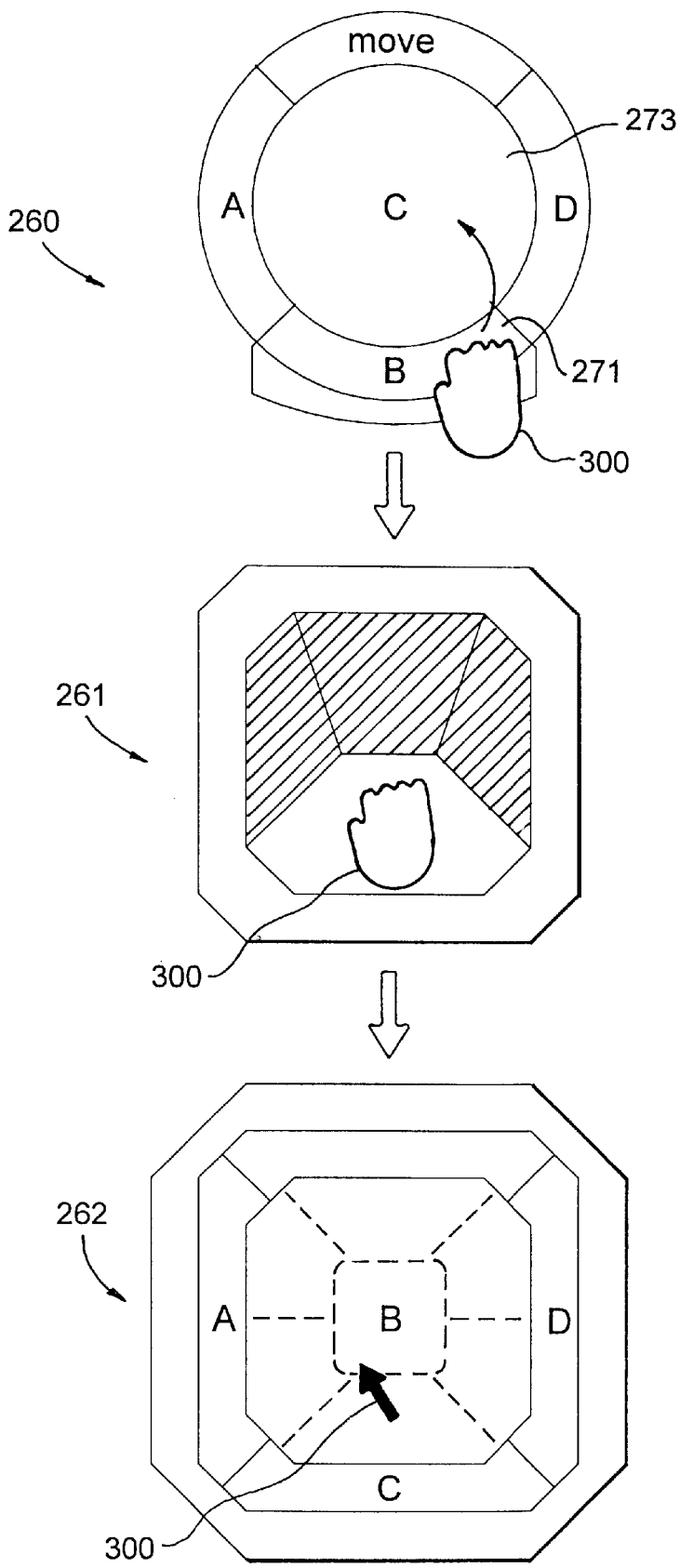
FIG. 4 shows switching of a composite function group in the preferred embodiment of this invention.

FIG. 4 shows the operation to switch the composite function groups. In this figure, a composite function icon of a C group is switched to a composite function icon of a B group 261, as depicted in composite function icon 262 of the B group. In the preferred embodiment of this invention, the groups are switched by a drag and drop operation from a group switching area 271 to a composite function area 273 of composite function icon 260 rather than clicking the group switching area 271 to avoid an erroneous switching of a composite function icon.

The size change/move area 250 comprises 2 kinds of areas including size change areas 251, 253, 255, 257 disposed in the 4 corners of the icon area 200 and move areas 252, 254, 256, 258 corresponding to the side portions of the icon area 200.

The operator can enlarge or reduce the icon area 200 to a desired size by clicking a mouse button in any of the size change areas 251, 253, 255, 257 and releasing the mouse button in a desired position. Also, The operator can move the icon area 200 to a desired position by clicking a mouse button in any of the move areas 252, 254, 256, 258 and releasing the mouse button in a desired position.

While the areas 252, 254, 256, 258 are defined as move areas in the preferred embodiment of this invention, these areas may be used as areas for enlarging/reducing only in the horizontal or vertical direction.

C-2 Appearance Image/Function Decision Table

Next, the appearance image/function decision table in the preferred embodiment of this invention is now described.

Figure 6:
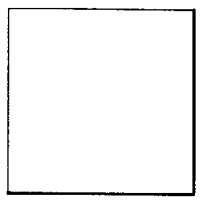
FIG. 6 is a schematic diagram of an area table in the preferred embodiment of this invention.

FIG. 6 shows an area table 400 provided for quickly determining whether or not the mouse pointer is currently in any of the composite function area 230, the composite group switching area 240 and the size change/move area 250.

The area table 400 controls an area definition formula 401 and an area number 403. In the area definition formula 401, an inequality for defining each area in the icon area 200 (composite function area 230, composite group switching area 240 and size change/move area 250) is set.

In the preferred embodiment of this invention, each item of the area table 400 is registered for each group of the composite functions and each dividing scheme to be described later. In the preferred embodiment of this invention, each item of the area table is defined as a function of a starting point of the icon area 200 and the rate of size change with respect to a standard size of the icon area. Information representing the size such as the number of dots may be also used rather than the rate of size change.

The composite function area 230, for example, is defined by an inequality;

$$X>X0+a, X<X0+b$$

$$Y>Y0+c, Y<Y0+d$$

where (X0, Y0) is the starting point of the icon area and (X,Y) is the position of the mouse pointer. a, b, c, d are constants and is the rate of size change of the icon area.

The area number is a number allocated to each of the composite function area 230, the composite group switching area 240, and the size change/move area 250.

Figure 7:
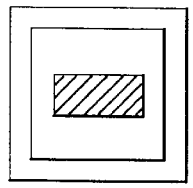
FIG. 7 is a schematic diagram of a composite function table in the preferred embodiment of this invention.

FIG. 7 shows a composite function table in the preferred embodiment of this invention. The composite function table 410 controls a function name 411, a function area number 413, a function area definition formula 415, an image data name 417 and an in-area flag 419 for each group of composite function areas and the division scheme.

In the preferred embodiment of this invention, each item of the function area table 410 is registered for each kind of the group of the composite function areas and the division scheme to be described later. When the icon area is narrow in the preferred embodiment of this invention, a function of more importance (high frequency of use) is selected in contrast to a composite function of a same group having a wider icon area. By doing so, the operator can set the icon area in a small size for a normal operation of frequent use to utilize a limited functions while the operator can set the icon area in a large size in performing an irregular process to utilize a function of less frequent use.

The function name is information to identify the function to be executed and can be registered by a path name and a function name (name of a run module) in the preferred embodiment of this invention.

The function area number 413 is a number allocated to each function area. The function area definition formula 415 has an inequality for defining each function area set therein. In the preferred embodiment of this invention, the function area definition formula is also defined as a function of the starting point of the icon area 200 and the rate of size change.

The image data name 417 is information to identify appearance image data corresponding to each function area and may be registered in the form of a path name and an image data name in the preferred embodiment of this invention.

The in-area flag 419 is a flag indicating that a mouse pointer is currently on that function area.

Figure 8:
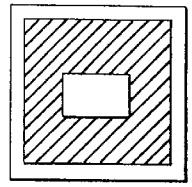
FIG. 8 is a schematic diagram of a group switching table in the preferred embodiment of this invention.

FIG. 8 shows a group switching table 430 which controls a group area definition formula 431, a group switching area number 433, a function name 435 and a selected flag 437 for each group of composite function areas and the division scheme.

The group area definition formula 431 has an inequality for defining each group switching area set therein. In the preferred embodiment of this invention, the group switching area definition formula is also defined as a function of the starting point of the icon area 200 and the rate of size change.

The group switching area number 433 is a number allocated to each switching area. The function name 435 is information for identifying a function (of group switching) to be executed and can be registered by a path name and a function name (name of run module) in the preferred embodiment of this invention. Selected flag 437 is a flag indicating that the group has been currently selected.

While the appearance image of the group switching area 240 is registered integrally in the appearance image data correlated to the function area as a single appearance image data in the preferred embodiment of this invention, the appearance image data of the composite function area 230 and the appearance image of the group switching area 240 may be separately registered and the appearance image of the group switching area 240 may be controlled by the group switching table 430.

Figure 9:
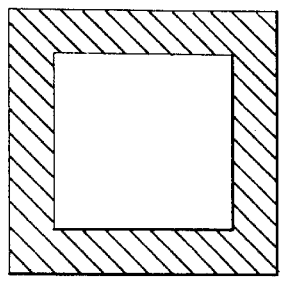
FIG. 9 is a schematic diagram of a size change/move table in the preferred embodiment of this invention.

FIG. 9 shows a size change/move table in the preferred embodiment of this invention. The size change/move table 450 controls a size change/move area definition formula 451 and a function name 453.

The size change/move area definition formula 451 has an inequality for defining each size change/move area set therein. In the preferred embodiment of this invention, the size change/move area definition formula is also defined as a function of the starting point of the icon area and the rate of size change.

The function name 453 is information for identifying the function (of size change/move) to be executed and may be registered by a path name and a function name (name of run module) in the preferred embodiment of this invention. When the composite function icon is changed in size or moved in the preferred embodiment of this invention, the value of the result after the change is held as information in the form of the starting point of the icon area 200 and the rate of size change of the icon area 200.

Figures 10, 11:
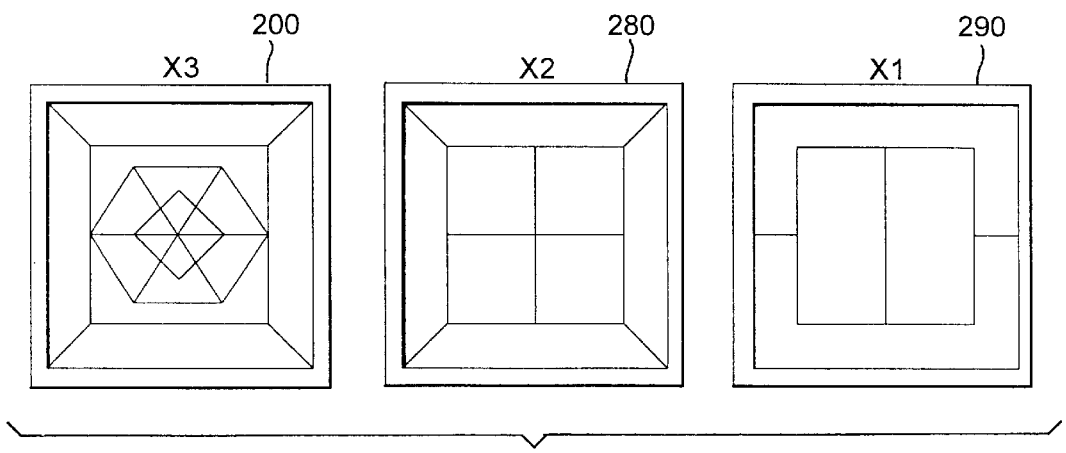
FIG. 10 is a schematic diagram of a division scheme decision table in the preferred embodiment of this invention.
FIG. 11 is a schematic diagram showing the structure of an icon area corresponding to a division scheme in the preferred embodiment of this invention.

FIG. 10 shows a division scheme decision table in the preferred embodiment of this invention. The division scheme decision table 470 controls the range of the rate of size change and the division scheme 473 for each group of the composite functions. By deciding the division scheme, the shape and internal layout of the composite function area 230, the group switching area 240 and the size change/move area 250, etc., can be set in a form which fits the size of the icon area as shown in FIG. 11, representing icon areas 200, 280 and 290.

The range of the rate of size change for selecting a particular division scheme is registered in the range of size change rate 471 of the division scheme decision table 470 in the preferred embodiment of this invention. While the range is set based on the size change rate with respect to a standard number of dots of the icon area in the preferred embodiment of this invention, the number of dots may be an immediate condition to decide a division scheme.

Also, while the icon area is enlarged or reduced with the shape maintained analogous in the preferred embodiment of this invention, the decision condition of the division scheme may be defined by a binary inequality of a size change rate (or the number of dots) in x direction and a size change rate (or the number of dots) in y direction in a mode to allow enlargement and reduction in x direction and y direction, respectively.

The tables of FIG. 6 to FIG. 10 described in the above are given merely as an example and each item may be correlated in other form. For example, when the function area is decided by the position of a mouse pointer, a function area can be identified by a combination of IF and ELSE statements, etc., rather than checking whether or not the definition formula registered in the table is met.

Incidentally, because the frequency of deciding a function area from the position of a mouse pointer is high in the composite function table 410 and the group switching table 430, it is disadvantageous from a view point of occupancy of the memory area to control by a separate table which is isolated from other items but this is effective in increasing the processing speed.

C-3. Description of Operation

Figure 12:
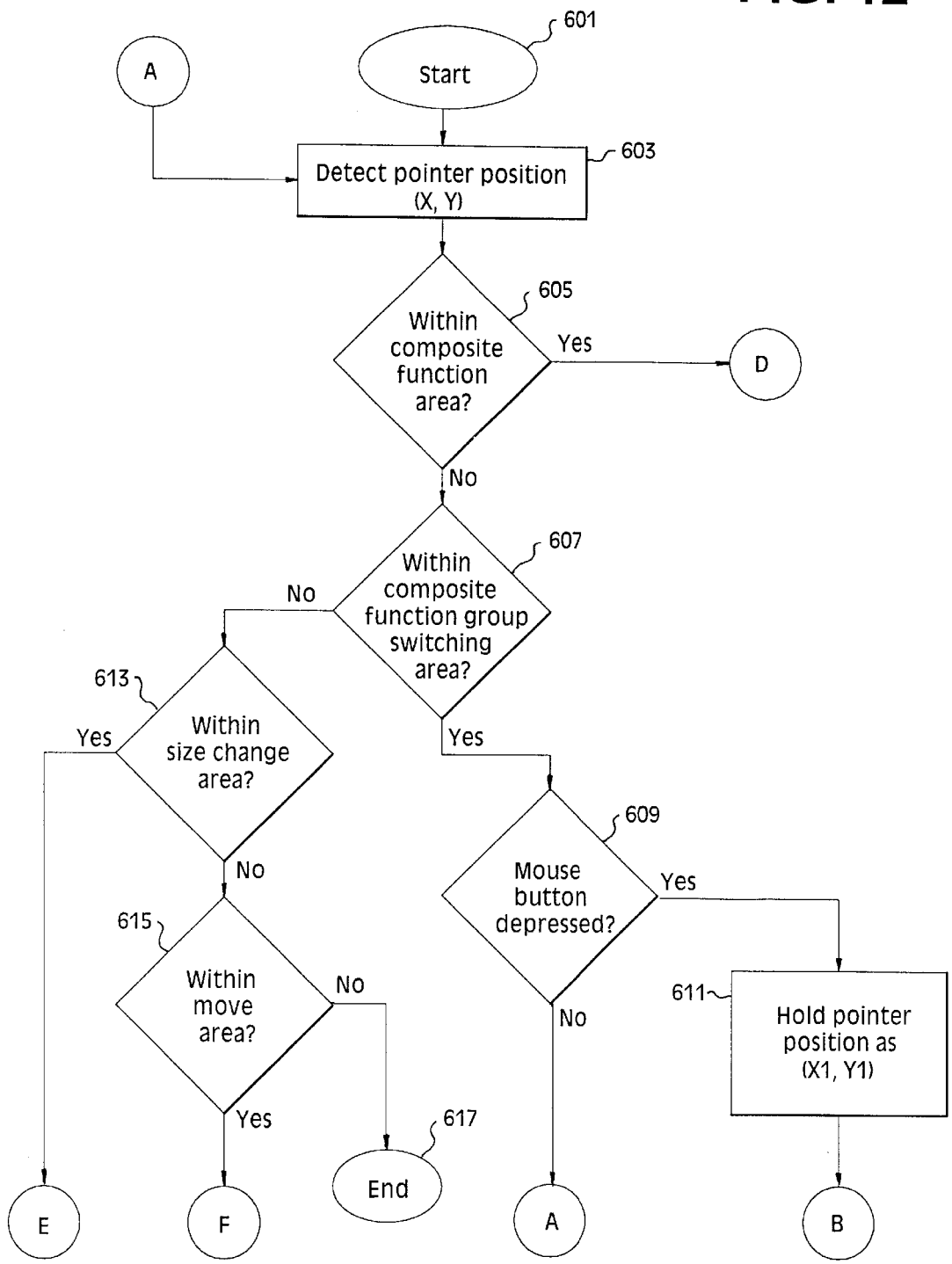
FIG. 12 is a main flow in the operation of a composite function icon in the preferred embodiment of this invention.

The sequence of operations of the composite function icon in the preferred embodiment of this invention is now described with reference to the flow chart of FIG. 12 to FIG. 16. FIG. 12 shows a main flow in the operation of the composite function icon.

As shown in the figure, when the process starts (block 601), a current position of the mouse pointer (X, Y) is detected (block 603). It is then determined whether or not the current position of the mouse pointer is within the composite function area by using the area table 400 (FIG. 6) (block 605).

Figure 15:
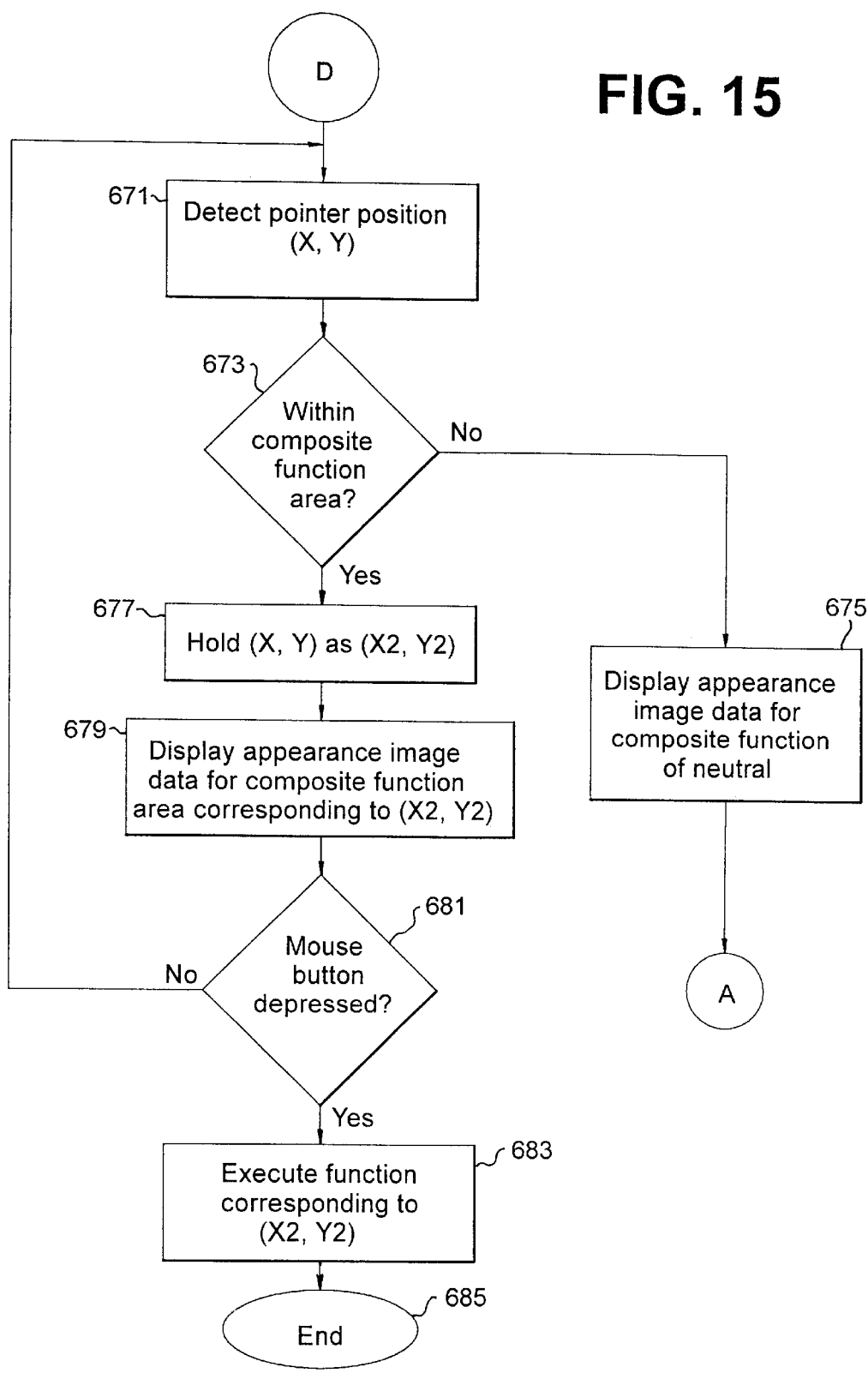
FIG. 15 is a flow chart showing the processing procedure of the execution logic of a function allocated to a function area in the preferred embodiment of this invention.

If it is determined that the current position of the mouse pointer is within the composite function area, the flow proceeds to a processing procedure of "execution logic of a function corresponding to the function area" which is explained in FIG. 15. If it is determined that the current position of the mouse pointer is outside the composite function area, it is further determined whether or not the current position of the mouse pointer is within the composite function group switching area by using the area table 400 (FIG. 6) (block 607).

If it is determined that the current position of the mouse pointer is within the composite function group switching area, it is determined whether or not the mouse button is depressed (block 609). If the mouse button is not depressed, the flow returns to the top of the process to wait movement of the mouse pointer or clicking of the mouse button by the operator.

Figure 13:
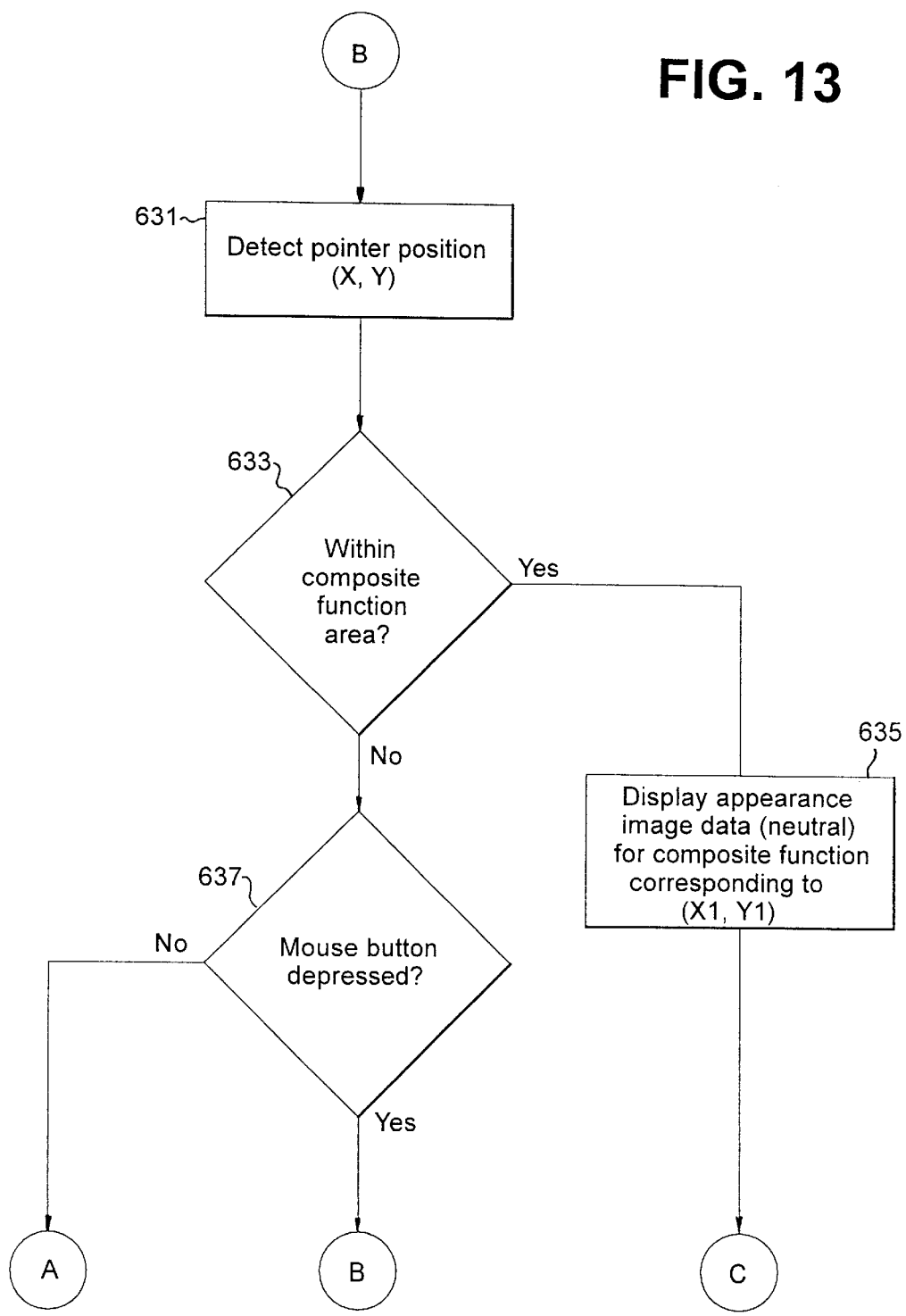
FIG. 13 is a flow chart showing the processing procedure of the switching/display logic of a group of composite functions in the preferred embodiment of this invention.

When the mouse button has been depressed, the position where the mouse pointer is depressed is held as (X1, Y1) (block 611) and the flow proceeds to the processing procedure of "switching logic of the composite function group" which is to be explained in FIG. 13.

Figure 16:
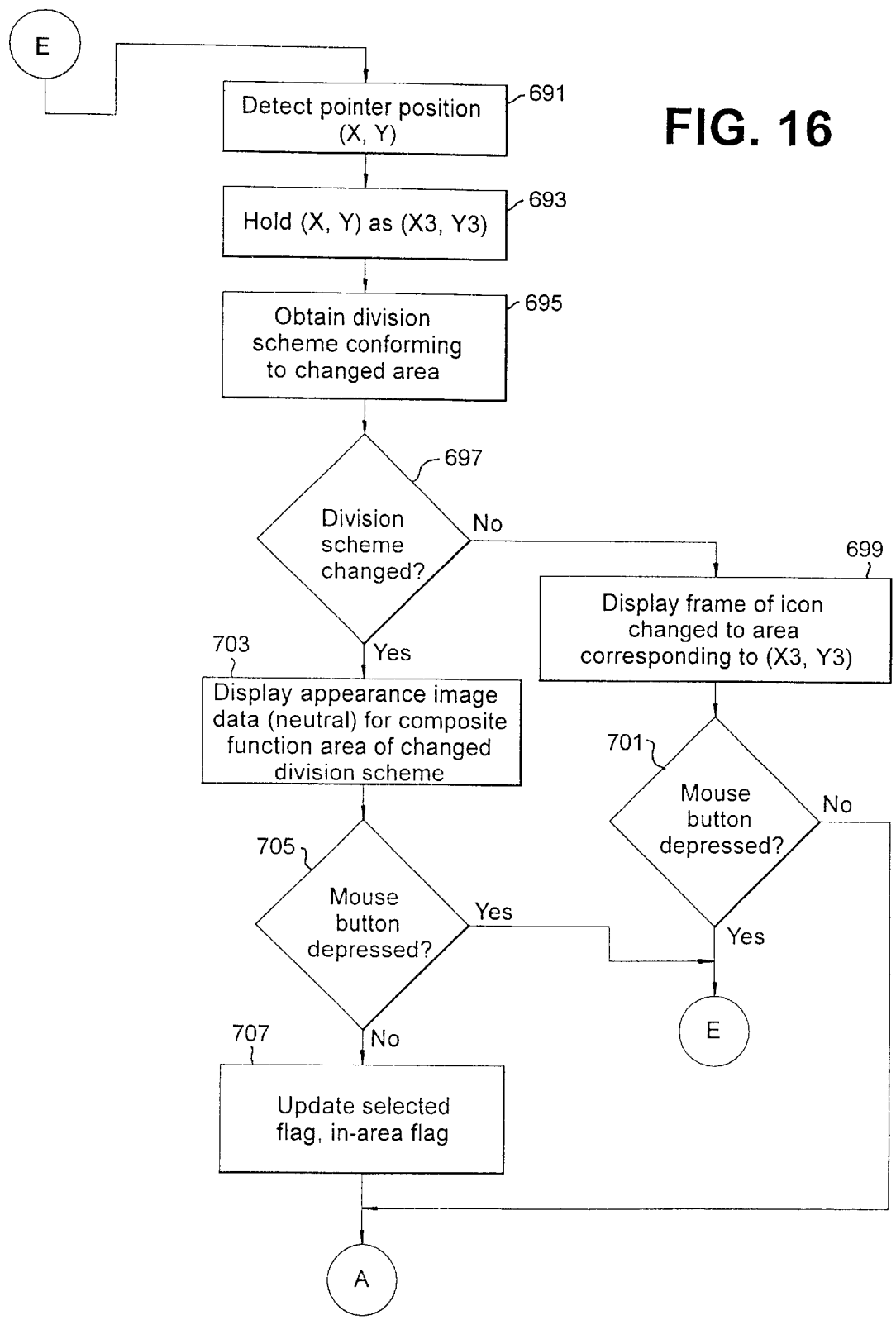
FIG. 16 is a flow chart showing the processing procedure of the size change logic of an icon area in the preferred embodiment of this invention.
Figure 17:
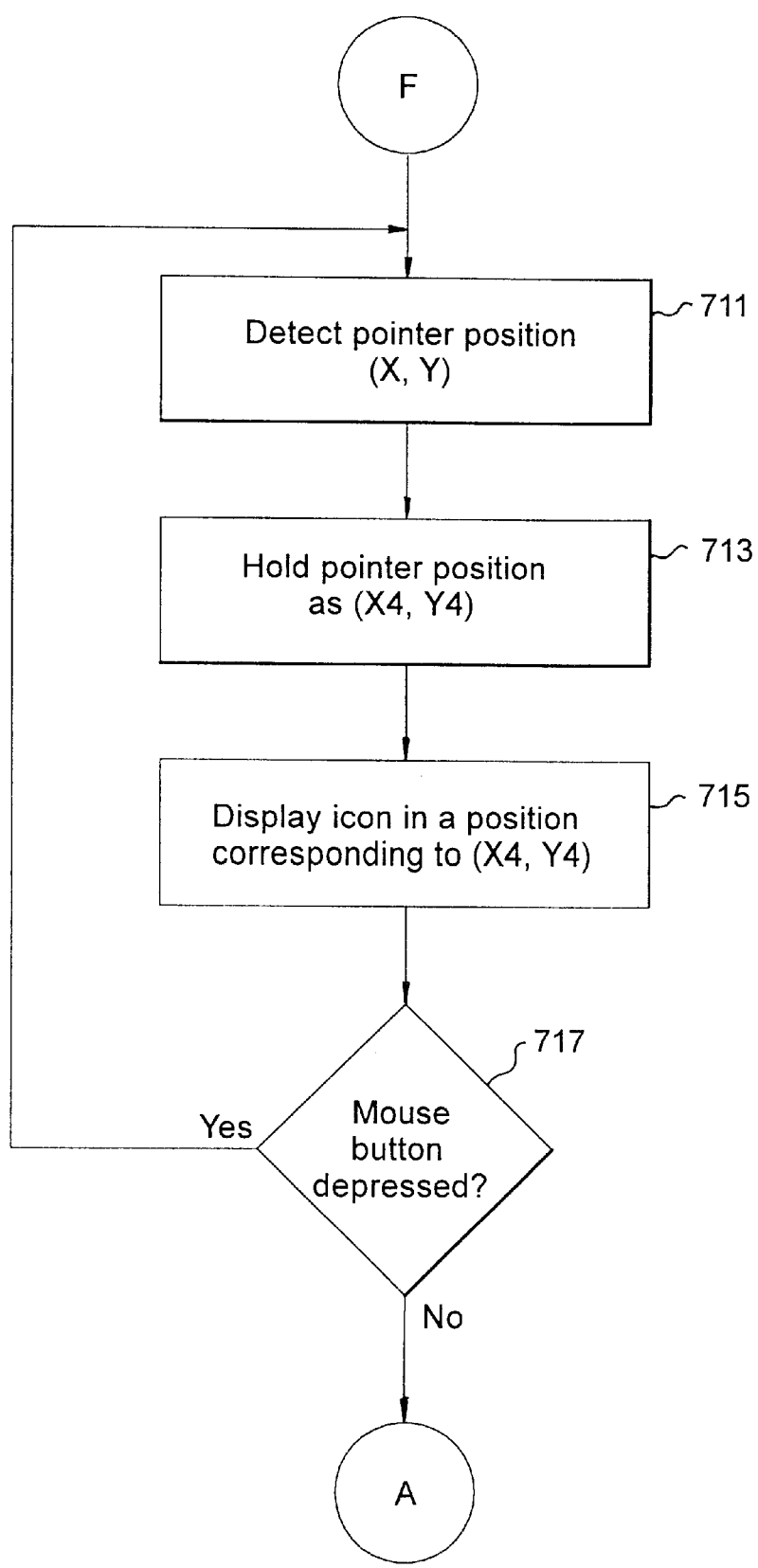
FIG. 17 is a flow chart showing the processing procedure of the move logic of an icon area in the preferred embodiment of this invention.

When it is determined that the current position of the mouse pointer is outside the composite function group switching area, it is further checked whether or not it is in the size change area (block 613) and whether or not it is in the move area (block 615) by using the area table 400 (FIG. 6) and the flow proceeds to the processing procedure of "size change logic of the icon area" and "move logic of the icon area", respectively, to be explained in FIG. 16 and FIG. 17 if the determination is true. If the both determination fail, it is determined that the pointer 300 does not exist in the icon area 200 and the process ends (block 617).

FIG. 13 is a flow chart showing the processing procedure of "display logic of switching composite function group".

As shown in the figure, the current position of the pointer is detected first in this processing procedure (block 631) and it is determined whether or not the current position of the pointer is within the composite function area (block 633).

If it is determined that the current position of the pointer is within the composite function area, a composite function group corresponding to the pointer position (X1, Y1) is searched for in the group switching table 430 of FIG. 8, and the composite function table 410 of FIG. 7 is searched using the retrieved composite function switching group and the current division scheme as a key to find appearance image data corresponding to a function number 0 (neutral) for displaying it in the icon area 200 (block 635). The appearance image data is displayed after the size of the image data is changed corresponding to the rate of size change as required. The flow then proceeds to the top of FIG. 14.

If it is determined that the current position of the pointer is outside the composite function area, it is then determined whether or not the mouse button is depressed (block 637). If the mouse button is depressed, the flow returns to the top of FIG. 13 to wait for the mouse pointer entering the composite function area. If it is determined that the mouse button is not depressed, it is determined that the operator interrupted the job or performed an illegal processing and the process returns to the top of the main flow.

Figure 14:
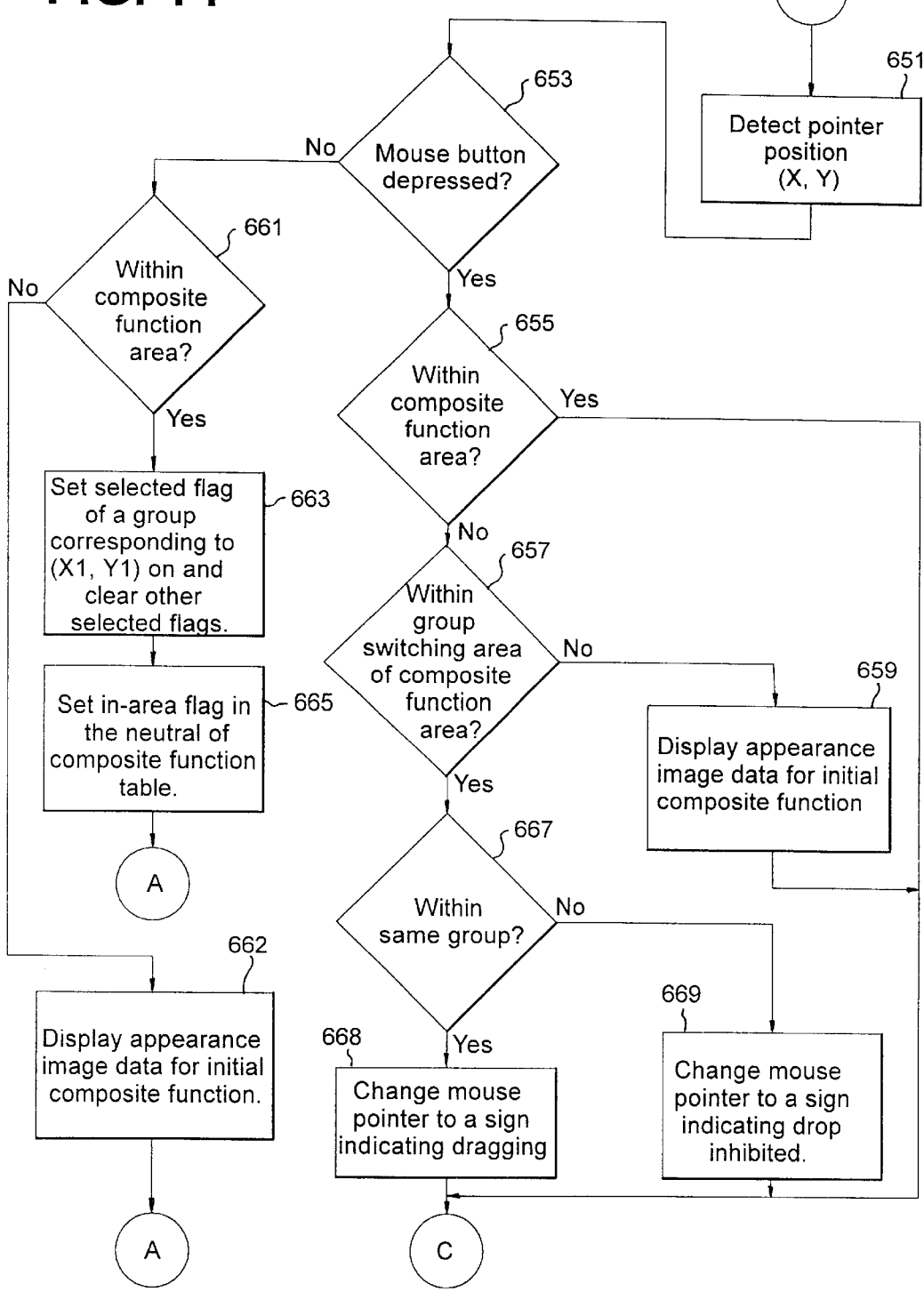
FIG. 14 is a flow chart showing the processing procedure of the decision logic of switching a group of composite functions in the preferred embodiment of this invention.

FIG. 14 is a flow chart showing the processing procedure of "decision logic of switching composite function group" in the preferred embodiment of this invention.

As shown in the figure, the current position of the pointer is detected first in this processing procedure (block 651) and it is then determined whether or not the mouse is depressed (block 653).

When it is determined that the mouse has been depressed, it is further determined whether or not the mouse pointer is within the composite function area 230 (block 655). If it is determined that the mouse pointer is within the composite function area 230, the process returns to the top of FIG. 14 to wait the mouse button being released.

If it is determined that the mouse is outside the composite function area 230, it is further determined whether it is within or outside the switching area 240 of the group of the composite function areas (block 657). If it is determined that the mouse pointer is within the switching area 240 of the group of the composite function areas, it is further determined whether or not the current position of the pointer is within the group switching area to which (X1, Y1) belongs by using the group switching table of FIG. 8 (block 667). If it is determined that the mouse pointer is not within the switching areas 240 of the group composite function areas (block 657), appearance image for the initial composite function is displayed (block 659).

If the current position of the pointer is within the group switching area to which (X1, Y1) belongs, the mouse pointer is switched to a sign (a mark of a hand in the preferred embodiment of this invention) indicating that the mouse is being dragged (block 668) and, if the current position of the pointer is not within the group switching area to which (X1, Y1) belongs, the mouse pointer is switched to a sign (a mark of a do-not-enter sign in the preferred embodiment of this invention) indicating that the mouse can not be dropped (block 669) and the process returns to the top of FIG. 14 to wait the mouse button being released.

Not only the display of the mouse pointer is changed, but also a statement of operation as described in U.S. Pat. No. 5,436,637 and the arts cited therein (a statement such as "drop the mouse pointer at the center of the icon", for example) may be displayed in the display frame of the bottom of the screen or in the balloon help.

On the other hand, if it is determined that the mouse button is released in the block 653, it is further determined whether or not the mouse is within the composite function area (block 661). If it is determined that the mouse is outside the composite function area, it is determined that the mouse once entered the composite function area and then the mouse button is released outside the composite function area and the appearance image data for the initial composite function is displayed (block 662). The process then returns to the top of the main flow to wait a valid operation.

If it is determined that the mouse is within the composite function area, a selected flag 437 (FIG. 8) of the switching group of the composite function in the composite function group switching area to which (X1, Y1) belongs is set on (block 663), a division scheme of the newly selected group is selected from the current rate of size change, and a flag 475 for the selected division scheme is set. An in-area flag 419 corresponding to function number 0 (neutral) of the composite function table 410, FIG. 7, which was retrieved using the switching group of the composite function and the selected division scheme as a key is set on (block 665).

FIG. 15 is a flow chart showing the processing procedure of "execution logic of a function allocated to function area" in the preferred embodiment of this invention.

As shown in the figure, the current position of the pointer is detected first in this processing procedure (block 671) and it is determined whether or not the pointer position is within the composite function area (block 673).

If it is determined that the pointer position is outside the composite function area, it is determined that the mouse pointer which once entered the composite function area (block 605) has moved out of the composite function area without being clicked and thus the in-area flag of a neutral state of the currently displayed composite function area is set on to display the appearance image data corresponding thereto (block 675).

If it is determined that the pointer position is within the composite function area, the current pointer position (X, Y) is held as (X2, Y2) (block 677). The appearance image data 417 corresponding to (X2, Y2) is then retrieved based on the function area definition formula 415 to display it in the icon area 200 (block 679). In a mode where the appearance image data is held separately in the composite function area 230 and the group switching area 240, only the part in the composite function area is updated.

It is determined thereafter whether or not the mouse button is depressed (block 681) and a function corresponding to (X2, Y2) is executed when the mouse button is depressed (block 683). If the mouse button is not depressed, the process returns to the top of the flow of FIG. 18 to wait a mouse click.

FIG. 16 is a flow chart showing the processing procedure of "size change logic of icon area" in the preferred embodiment of this invention.

As shown in the figure, the current position of the pointer is first detected (block 691) and the current pointer position is held as (X3, Y3) (block 693). Then, the rate of size change of the icon area corresponding to (X3, Y3) is calculated to obtain the division scheme conforming to the changed icon area (block 695). It is then determined using the flag 475 of the division scheme decision table, FIG. 10, whether or not the current division scheme needs be changed to another one (block 697).

When it is not necessary to change the current division scheme to another one, the frame of the composite function icon is changed to a size corresponding to (X3, Y3) and is displayed (block 699). Information of the starting point of the icon area and the rate of size change are then updated. It is then determined whether or not the mouse button is depressed (block 701) and the process returns to the top of the flow in FIG. 16 to wait the mouse button being released if the mouse button is depressed. If the mouse button is not depressed (when the mouse button is released), the size change process ends and the process returns to the main flow.

When it is necessary to change the current division scheme to another one, the current composite function switching group (the group in which the selected flag 437 is on) and the appearance image of function area number 0 (neutral) corresponding to the changed division scheme are retrieved from the composite function table of FIG. 7 and changed to a size corresponding to (X3, Y3) for display (block 703).

It is then determined whether or not the mouse button is depressed (block 705) and the process returns to the top of the flow in FIG. 16 to wait the mouse button being released if the mouse button is depressed. If the mouse button is not depressed (when the mouse button is released), the size change process ends, a flag is set to the changed division scheme of the division scheme decision table 470, FIG. 10, and the selected flag 437 of the group switching table 430 of FIG. 8 is set in a place corresponding to the changed division scheme in the currently selected group.

Similarly, the composite function table of FIG. 7 sets an in-area flag of function area number 0 (neutral) corresponding to the current group and the changed division scheme while clearing other flags. The size change process then ends and the process returns to the main flow.

FIG. 17 is a flow chart showing the processing procedure of "move logic of icon area" in the preferred embodiment of this invention.

As shown in the figure, the current pointer position is first detected (block 711) and the current pointer position (X, Y) is held as (X4, Y4) (block 713).

The frame of the composite function icon is changed to a size corresponding to (X4, Y4) and is displayed (block 715). Information of the starting point of the icon area and the rate of size change are then updated. It is then determined whether or not the mouse button is depressed (block 717) and the process returns to the top of the flow in FIG. 17 to wait the mouse button being released if the mouse button is depressed. If the mouse button is not depressed (when the mouse button is released), the move process ends and the process returns to the main flow.

D. Example of Application

Figure 18:
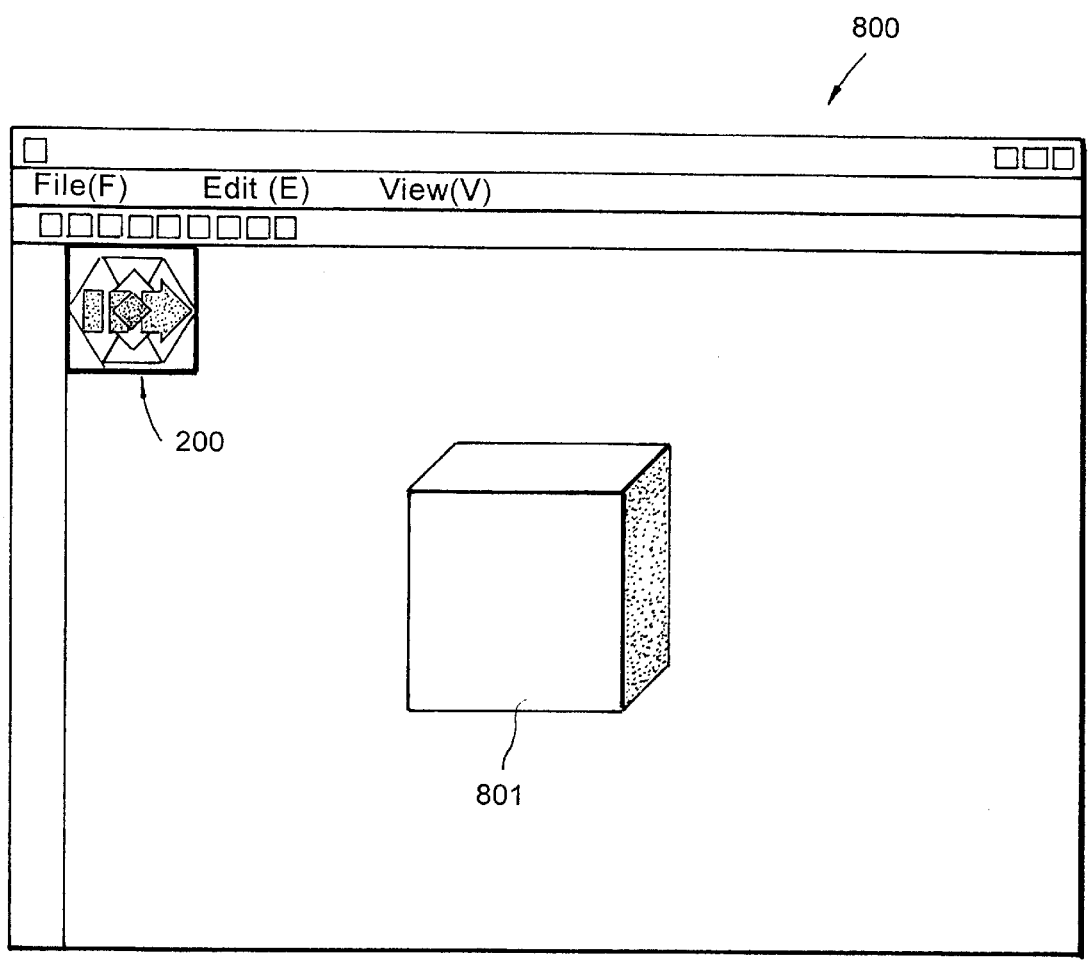
FIG. 18 is a chart showing an embodiment where the composite function icon in the preferred embodiment of this invention is applied to an image processing system.

FIG. 18 shows an embodiment where the composite function icon of this invention is applied to an image processing system. An object 801 to be operated upon and a composite function icon 200 are displayed. composite function area 230 of the composite function icon 200 is divided into areas as shown in FIG. 13 and appearance images 301 to 317 as shown in FIG. 5 are allocated to respective function areas.

A neutral function (do nothing) is correlated to the function area corresponding to the appearance image data 301 while a function to move the object 801 to the left (in the negative x direction) is correlated to the appearance image data 303.

A function to move the object 801 to the right (in the positive x direction) is correlated to the function area corresponding to the appearance image data 305 while a function to move the object 801 upward (in the negative y direction) is correlated to the appearance image data 307.

A function to move the object 801 downward (in the positive y direction) is correlated to the function area corresponding to the appearance image data 309 while a function to rotate the object 801 counterclockwise around the z axis is correlated to the appearance image data 311.

A function to rotate the object 801 clockwise around the z axis is correlated to the function area corresponding to the appearance image data 313 while a function to rotate the object 801 counterclockwise around the y axis is correlated to the appearance image data 315.

A function to rotate the object 801 clockwise around the y axis is correlated to the function area corresponding to the appearance image data 317. These functions are well known in the art of the image processing system and are not described in detail.

Figure 19:
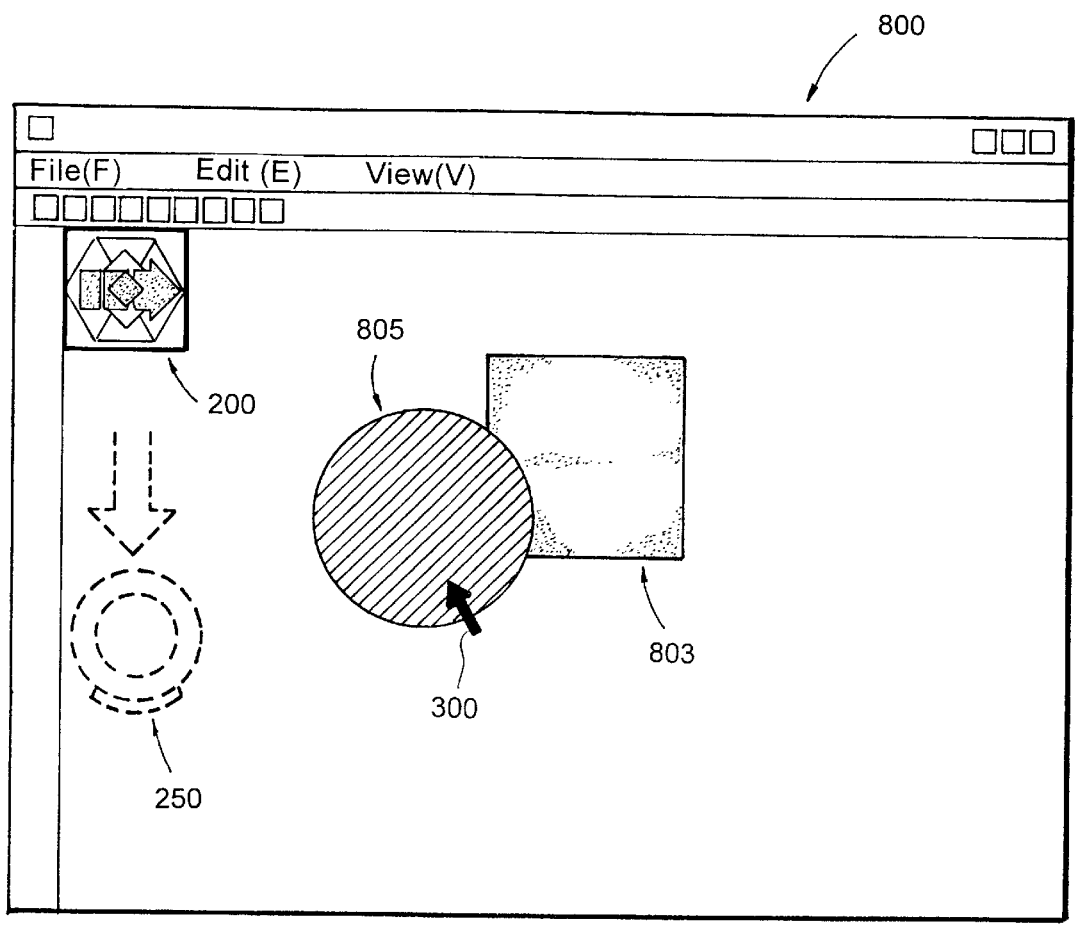
FIG. 19 is a chart showing an embodiment where the composite function icon in the preferred embodiment of this invention is applied to processing of a plurality of objects.

In the preferred embodiment of this invention, a function to be executed may be changed or the function group may be switched depending on the kind of an object to be selected. FIG. 19 shows an embodiment where the composite function icon of the preferred embodiment of this invention is applied to processing of a plurality of objects.

In one mode of the preferred embodiment of this invention, when a rectangular object 803 is clicked by the mouse pointer 300 and then a function area where a composite function icon 200 exists is clicked, for example, a function corresponding to the rectangular object 803 is executed. When a circular object 805 is clicked by the mouse pointer 300 and then the same function area is clicked, a function corresponding to the circular object 805 is executed.

This may be implemented by temporarily storing the property of a currently controlled object (object selected latest), making the function name 411 of the composite function table 410 in FIG. 7 be a dummy function, and switching the function to be executed depending on whether or not the dummy function has a predetermined kind of property (attribute information of the object) in executing the dummy function.

In another mode of the preferred embodiment of this invention, when a rectangular object 803 is clicked by the mouse pointer 300 and then a circular object 805 is clicked, for example, the composite function icon 200 corresponding to the rectangular object 803 is switched to a composite function icon 250 corresponding to the circular object 805.

When the circular object 805 is a graphic object, for example, a function of changing the kind of a line (dotted line, thin line, thick line, etc.) which is the property of the circular object 805 may be allocated to the function area (a property such as a color may be changed in other groups) while, when the rectangular object 803 is an object in a text area, a function of changing the font size (10 points, etc.) which is the property of the circular object 803 may be allocated to the function area.

This may be also implemented by temporarily storing the property of a currently controlled object (object selected latest), determining whether or not the value of a particular property changes when another object is selected, retrieving a composite function icon corresponding to that property (a table specifying a composite function icon corresponding to a specific property is registered), and switching to that composite function icon.

As described in the above, this invention provides a GUI environment of improved operability which allows each function to be described by a rich graphic expression even when the number of the kinds of functions required for a software increases.

In another mode of this invention, the user operability of a software is improved by grouping a plurality of functions intimately related to a user in an icon area which is expressed by a single appearance image.

In a further mode of this invention, an area occupied by a main window is enlarged by allocating a plurality of functions to a single icon to reduce the number of icons on the screen.

In a further mode of this invention, a GUI environment is provided which is capable of preventing an erroneous operation by a user beforehand by changing the entire appearance (or a part of appearance) of an icon depending on the position of a mouse pointer on the icon and explicitly notifying the operator of a function which is to be executed when clicked in that position before the function is executed.

In a still further mode of this invention, a GUI environment of a high operability is provided which allows an operator to freely set an appearance corresponding to each function area to a size which is identifiable to the operator by enabling the operator to enlarge or reduce an icon area.

In a further mode of this invention, a GUI environment is provided which allows an operator to dynamically select a function group which the operator desires.

In a further mode of this invention, a GUI environment is provided which allows an operator to dynamically select a function of a kind which is related to an icon area.

In a still further mode of this invention, an image processing system is provided which is intuitively understandable to an operator.

While the invention has been particularly shown and described with respect to preferred embodiments thereof, it will be understood by those skilled in the art that the foregoing and other changes in form and details may be made therein without departing form the spirit and scope of the invention.

Having thus described the invention, what we claim as new, and desire to secure by Letters Patent is:

1. A method for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said method comprising the steps of:

(a) checking whether or not said pointer is on said first function area, (b) displaying said first appearance image in an area which is at least a part of said icon area including said first function area and said second function area when said pointer is on said first function area, (c) checking whether or not said pointer is on said second function area, (d) displaying said second appearance image in an area which is at least a part of said icon area including said first function area and said second function area when said pointer is on said second function area, (e) determining whether or not an operation to select said second function area has been performed by an operator, (f) executing said second function when the operation to select said second fiction area has been performed by the operator, and (g) enabling selection of a third function area which was not included in said icon area before size of said icon area was changed by an operator, said third function area being correlated to a third function and a third appearance image included in the icon area the size of which has changed.

2. A method for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said method comprising the steps of:

(a) checking whether or not said pointer is on said first function area, (b) displaying said first appearance image in an area which is at least a part of said icon area including said first function area and said second function area when said pointer is on said first function area, (c) checking whether or not said pointer is on said second function area, (d) displaying said second appearance image in an area which is at least a part of said icon area including said first function area and said second function area when said pointer is on said second function area, (e) determining whether or not an operation to change the size of said icon area has been performed by an operator, (f) changing the size of said first function area, said second function area and said icon area in response to the operation to change the size, (g) determining whether or not an operation to select the second function area the size of which has been changed has been performed by an operator, (h) executing said second function when the operation to select said second function area the size of which has been changed has been performed by the operator, and (i) enabling selection of a third function area which was not included in said icon area before size of said icon area was changed by an operator, said third function area being correlated to a third function and a third appearance image included in the icon area the size of which has changed.

3. A method for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said method comprising the steps of:

(a) checking whether or not said pointer is on said first function area, (b) displaying said first appearance image in an area which is at least a part of said icon area including said first function area and said second function area when said pointer is on said first function area, (c) checking whether or not said pointer is on said second function area, (d) displaying said second appearance image in an area which is at least a part of said icon area including said first function area and said second function area when said pointer is on said second function area, (e) determining whether or not an operation to change the size of said icon area has been performed by an operator, (f) determining whether or not the change of the size meets a predetermined condition, (g) having a third function area which was not included in said icon area before the size was changed and is correlated to a third function and a third appearance image included in the icon area the size of which has been changed when the change of the size meets the predetermined condition, (h) determining whether or not an operation to select the third function area has been performed by an operator, and (i) executing said third function when the operation to select said third function area has been performed by the operator.

4. A method for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said method comprising the steps of:

(a) checking whether or not said pointer is on said first function area, (b) displaying said first appearance image in an area which is at least a part of said icon area including said first function area and said second function area when said pointer is on said first function area, (c) checking whether or not said pointer is on said second function area, (d) displaying said second appearance image in an area which is at least a part of said icon area including said first function area and said second function area when said pointer is on said second function area, (e) determining whether or not an operation to indicate the change a function group has been performed by an operator, (f) having a third function area which was not included in said icon area before the operation to indicate the change of the function group was performed and is correlated to a third function and a third appearance image and a fourth function area which was not included in said icon area before the operation to indicate the change of the function group was performed and is correlated to a fourth function and a fourth appearance image included in the icon changed area when the operation to indicate the change of the function group was performed by the operator, (g) determining whether or not said pointer is on said third function area, (h) displaying said third appearance image in an area which is at least a part of said icon area and includes said third function area and said fourth function area when said pointer is on said third function area, (i) determining whether or not said pointer is on said fourth function area, (j) displaying said fourth appearance image in an area which is at least a part of said icon area and includes said third function area and said fourth function area when said pointer is on said fourth function area, (k) determining whether or not an operation to select said fourth function area has been performed by the operator, and (l) executing said fourth function when the operation to select said fourth function area has been performed by the operator.

5. A method for operating on an object using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said first function converting an object displayed on the display by a first logical function and displaying the converted object, said second function converting an object displayed on the display by a second logical function and displaying the converted object, said first appearance image suggesting said first logical function, said second appearance image suggesting said second logical function, said method comprising the steps of:

(a) checking whether or not said pointer is on said first function area, (b) displaying said first appearance image in an area which is at least a part of said icon area and includes said first function area and said second function area when said pointer is on said first function area, (c) checking whether or not said pointer is on said second function area, (d) displaying said second appearance image in an area which is at least a part of said icon area and includes said first function area and said second function area when said pointer is on said second function area, (e) determining whether or not an operation to select said second function area has been performed by an operator, (f) converting said object by said second logical function and displaying the converted object by executing said second function when the operation to select said second function area has been performed by an operator, and (g) enabling selection of a third function area which was not included in said icon area before size of said icon area was changed by an operator, said third function area being correlated to a third function and a third appearance image included in the icon area the size of which has changed.

6. A method for operating on an object using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display and a pointing device, said first function changing a property of an object displayed on the display to a first value and displaying the changed property, said second function changing said property to a second value and displaying the changed property, said method comprising the steps of:

(a) checking whether or not said pointer is on said first function area, (b) displaying said fist appearance image in an area which is at least a part of said icon area and includes said first function area and said second function area when said pointer is on said first function area, (c) checking whether or not said pointer is on said second function area, (d) displaying said second appearance image in an area which is at least a part of said icon area and includes said first function area and said second function area when said pointer is on said second function area, (e) determining whether or not an operation to select said second function area has been performed by an operator, (f) changing said property to said second value and displaying the changed property by executing said second function when the operation to select said second function area has been performed by an operator, and (g) enabling selection of a third function area which was not included in said icon area before size of said icon area was changed by an operator, said third function area being correlated to a third function and a third appearance image included in the icon area the size of which has changed.

7. An information processing apparatus which is provided with a display and a pointing device and allows a function to be selected using a pointer of said pointing device on said display in an icon area of a composite icon, the icon area comprising a first function area which is correlated to a first function and a first appearance image and a second function area which is correlated to a second function and a second appearance image, said apparatus comprising:

(a) an input part for checking on which of said first and said second function areas said pointer is, (b) a function storage part for storing said first and said second functions, (c) an appearance image data storage part for storing said first and said second appearance images, (d) a function decision table for correlating said first function area to said first function and said second function area to said second function, (e) an appearance image decision table for correlating said first function area to said first appearance image and said second function area to said second appearance image, (f) an event detection part for detecting that an operation to select said first or said second function area has been performed, and (g) a function execution part for executing said first or said second function, wherein selection of a third function area which was not included in said icon area before size of said icon area was changed by an operator is enabled, said third function area being correlated to a third function and a third appearance image included in the icon area the size of which has changed.

8. An information processing apparatus which is provided with a display and a pointing device and allows a function to be selected using a pointer of said pointing device on said display in an icon area of a composite icon, the icon area comprising a first function area which is correlated to a first function and a first appearance image and a second function area which is correlated to a second function and a second appearance image, said apparatus comprising:
- (a) a determination part;
  - (a1) for searching an appearance image decision table which correlates said first fiction area to said first appearance image and said second function area to said second appearance image in response to a determination of on which of said first and said second function areas said pointer is, accessing to an appearance image data storage part storing said first and said second appearance images to specify appearance image data to be displayed in said icon area, and
  - (a2) for searching a function decision table which correlates said first function area to said first function and said second function area to said second function in response to a determination of on which of said first and said second function areas an operation indicating to select has been performed, accessing to a function storage part storing said first and said second functions to specify a function to be executed, and
- (b) a function execution part for executing said specified function, wherein selection of a third function area which was not included in said icon area before size of said icon area was changed by an operator is enabled, said third function area being correlated to a third function and a third appearance image included in the icon area the size of which has changed.

9. A recording medium storing a control program for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said control program comprising:
- (a) a program code for instructing said information processing apparatus to check whether or not said pointer is on said first function area,
- (b) a program code for instructing said information processing apparatus to display said first appearance image in an area which is at least a part of said icon area including said first function area and said second function area when said pointer is on said first function area,
- (c) a program code for instructing said information processing apparatus to check whether or not said pointer is on said second function area,
- (d) a program code for instructing said information processing apparatus to display said second appearance image in an area which is at least a part of said icon area including said first function area and said second function area when said pointer is on said second function area,
- (e) a program code for instructing said information processing apparatus to determine whether or not an operation to select said second function area has been performed by an operator,
- (f) a program code for instructing said information processing apparatus to execute said second function when the operation to select said second function area has been performed by the operator, and
- (g) a program code for enabling selection of a third function area which was not included in said icon area before size of said icon area was changed by an operator, said third function area being correlated to a third function and a third appearance image included in the icon area the size of which has changed.

10. A recording medium storing a control program for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said control program comprising:
- (a) a program code for instructing said information processing apparatus to check whether or not said pointer is on said first function area,
- (b) a program code for instructing said information processing apparatus to display said first appearance image in an area which is at least a part of said icon area including said first function area and said second function area when said pointer is on said first function area,
- (c) a program code for instructing said information processing apparatus to check whether or not said pointer is on said second function area,
- (d) a program code for instructing said information processing apparatus to display said second appearance image in an area which is at least a part of said icon area including said first function area and said second function area when said pointer is on said second function area,
- (e) a program code for instructing said information processing apparatus to determine whether or not an operation to change the size of said icon area has been performed by an operator,
- (f) a program code for instructing said information processing apparatus to change the size of said first function area, said second function area and said icon area in response to the operation to change the size,
- (g) a program code for instructing said information processing apparatus to determine whether or not an operation to select the second function area the size of which has been changed has been performed by an operator,
- (h) a program code for instructing said information processing apparatus to execute said second function when the operation to select said second function area the size of which has been changed has been performed by the operator, and
- (i) a program code for enabling selection of a third fiction area which was not included in said icon area before size of said icon area was changed by an operator, said third function area being correlated to a third function and a third appearance image included in the icon area the size of which has changed.

11. A recording medium storing a control program for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said control program comprising:
- (a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area including said first function area and said second function area when said pointer is on said second function area, (e) a program code for instructing said information processing apparatus to determine whether or not an operation to change the size of said icon area has been performed by an operator, (f) a program code for instructing said information processing apparatus to determine whether or not the change of the size meets a predetermined condition, (g) a program code for instructing said information processing apparatus to have a third function area which was not included in said icon area before the size was changed and is correlated to a third function and a third appearance image included in the icon area the size of which has been changed when the change of the size meets the predetermined condition, (h) a program code for instructing said information processing apparatus to determine whether or not an operation to select the third function area has been performed by an operator, and (i) a program code for instructing said information processing apparatus to execute said third function when the operation to select said third function area has been performed by the operator.

12. A recording medium storing a control program for selecting a function using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said control program comprising:

(a) a program code for instructing said information processing apparatus to check whether or not said pointer is on said first function area, (b) a program code for instructing said information processing apparatus to display said first appearance image in an area which is at least a part of said icon area including said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area including said first function area and said second function area when said pointer is on said second function area, (e) a program code for instructing said information processing apparatus to determine whether or not an operation to indicate the change a function group has been performed by an operator, (f) a program code for instructing said information processing apparatus to have a third function area which was not included in said icon area before the operation to indicate the change of the function group was performed and is correlated to a third function and a third appearance image and a fourth function area which was not included in said icon area before the operation to indicate the change of the function group was performed and is correlated to a fourth function and a fourth appearance image included in the changed icon area when the operation to indicate the change of the function group was performed by the operator, (g) a program code for instructing said information processing apparatus to determine whether or not said pointer is on said third function area, (h) a program code for instructing said information processing apparatus to display said third appearance image in an area which is at least a part of said icon area and includes said third function area and said fourth function area when said pointer is on said third function area, (i) a program code for instructing said information processing apparatus to determine whether or not said pointer is on said fourth function area, (j) a program code for instructing said information processing apparatus to display said fourth appearance image in an area which is at least a part of said icon area and includes said third function area and said fourth function area when said pointer is on said fourth function area, (k) a program code for instructing said information processing apparatus to determine whether or not an operation to select said fourth function area has been performed by the operator, and (l) a program code for instructing said information processing apparatus to execute said fourth function when the operation to select said fourth function area has been performed by the operator.

13. A recording medium storing a control program for operating on an object using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said first function converting an object displayed on the display by a first logical function and displaying the converted object, said second function converting an object displayed on the display by a second logical function and displaying the converted object, said first appearance image suggesting said first logical function, said second appearance image suggesting said second logical function, said control program comprising:

(a) a program code for instructing said information processing apparatus to check whether or not said pointer is on said first function area, (b) a program code for instructing said information processing apparatus to display said first appearance image in an area which is at least a part of said icon area and includes said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area and includes said first function area and said second function area when said pointer is on said second function area, (e) a program code for instructing said information processing apparatus to determine whether or not an operation to select said second function area has been performed by an operator, and (f) a program code for instructing said information processing apparatus to convert said object by said second logical function and display the converted object by executing said second function when the operation to select said second function area has been performed by an operator, and (g) a program code for enabling selection of a third function area which was not included in said icon area before size of said icon area was changed by an operator, said third function area being correlated to a third function and a third appearance image included in the icon area the size of which has changed.

14. A recording medium storing a control program for operating on an object using a pointer of a pointing device in an icon area of a composite icon, the icon area comprising a first function area which is correlated to a first function and a first appearance image and a second function area which is correlated to a second function and a second appearance image on a display of an information processing apparatus which is provided with a display, said first function changing the property of an object displayed on the display to a first value and displaying the changed property, said second function changing said property to a second value and displaying the changed property, said control program comprising:

(a) a program code for instructing said information processing apparatus to check whether or not said pointer is on said first function area, (b) a program code for instructing said information processing apparatus to display said first appearance image in an area which is at least a part of said icon area and includes said first function area and said second function area when said pointer is on said first function area, (c) a program code for instructing said information processing apparatus to check whether or not said pointer is on said second function area, (d) a program code for instructing said information processing apparatus to display said second appearance image in an area which is at least a part of said icon area and includes said first function area and said second function area when said pointer is on said second function area;

(e) a program code for instructing said information processing apparatus to determine whether or not an operation to select said second function area has been performed by an operator, and (f) a program code for instructing said information processing apparatus to change said property to said second value and display the changed property by executing said second function when the operation to select said second function area has been performed by an operator, and (g) a program code for enabling selection of a third function area which was not included in said icon area before size of said icon area was changed by an operator, said third function area being correlated to a third function and a third appearance image included in the icon area the size of which has changed.

15. A recording medium storing data which allows a composite icon to select a function using a pointer of a pointing device on a display of an information processing apparatus which is provided with said display and a pointing device, said composite icon being formed by an icon area comprising a first function area which is correlated to a first function and a first appearance image and a second function area which is correlated to a second function and a second appear image said recording medium, said medium comprising:

(a) a first function execution module which is an execution module of said first function, (b) a second function execution module which is an execution module of said second function, (c) first appearance image data for displaying said first appearance image, (d) second appearance image data for displaying said second appearance image, (e) a function decision table for correlating said first function area to said first function and said second function area to said second function, and (f) an appearance image decision table for correlating said first function area to said first appearance image and said second function area to said second appearance image, wherein selection of a third function area which was not included in said icon area before size of said icon area was changed by an operator is enabled, said third function area being correlated to a third function and a third appearance image included in the icon area the size of which has changed.

16. A method for executing a function within an icon area comprising a plurality of function areas forming a function group in a composite icon, each of the plurality of function areas being correlated to a function and being represented by an associated image, the method comprising;

detecting whether the pointing device is positioned over a function area in the function group;

displaying an associated image representing the function area in at least a part of the icon including the plurality of function areas if it is determined that the pointing device is positioned over the function area;

determining whether a user has selected the function area and executing a function correlated to the function area; and enabling selection of a new function area which was not included in the icon area before size of the icon area was changed by an operator, the new function area correlated to a function and being represented by an associated appearance image included in the icon area the size of which has changed.

17. The method for executing a function within an icon area according to claim 16, the method further comprising the steps of:

determining whether the user has changed a size of the icon area;

changing the size of the icon area and the plurality of function areas within the icon area in response to the determination that the use has changed the size of the icon area; and enabling the user to select a function area of the plurality of function areas the size of which has changed for execution.

18. The method for executing a function within an icon area according to claim 17, the method further comprising the steps of determining whether the change of the size of the icon area meets a predetermined condition;

displaying the new function area not displayed in the icon area before the size of the icon area was changed if the predetermined condition is met; and enabling the user to select the new function area displayed and executing the function correlated to the new function area.

19. The method for executing function within an icon area according to claim 16, the method further comprising the steps of:

determining whether the user has changed the function group comprising the plurality of function areas in the icon area to a new function group comprising a plurality of function areas, each of the plurality of function areas in the new function group being correlated to a function and being represented by an associated image;

detecting whether the pointing device is positioned over a function area in the new function group;

displaying an associated image representing the function area in at least a part of the icon including the plurality of function areas if it is determined tat the pointing device is positioned over the function area of the new group; and determining whether a user has selected the function area and executing a function correlated to the function area.

20. A method for operating an object by executing a function within an icon area comprising a plurality of function areas forming a function group in a composite icon, each of the plurality of function areas being correlated to a function and being represented by an associated image, the method comprising:

detecting whether the pointing device is positioned over a function area in the function group;

displaying an associated image representing the function area in at least a part of the icon including the plurality of function areas if it is determined that the pointing device is positioned over the function area;

determining whether a user has selected the function area and executing a function correlated to the function area;

converting the object and displaying the converted object in response to the execution of the function correlated to the function area; and enabling selection of a new function area which was not included in the icon area before size of the icon area was changed by an operator, the new function area correlated to a function and being represented by an associated appearance image included in the icon area the size of which has changed.

21. A method for changing a property value associated with an object by executing a function within an icon area comprising a plurality of function areas forming a function group in a composite icon, each of the plurality of function areas being correlated to a function and being represented by an associated image, the method comprising:

detecting whether the pointing device is positioned over a function area in the function group;

displaying an associated image representing the function area in at least a part of the icon including the plurality of function areas if it is determined that the pointing device is positioned over the function area;

determining whether a user has selected the function area and executing a function correlated to the function area;

changing the property value associated with the object to a new value and displaying the changed property value for the object in response to the execution of the function correlated to the function area; and enabling selection of a new function area which was not included in the icon area before size of the icon area was changed by an operator, the new function area correlated to a function and being represented by an associated appearance image included in the icon area the size of which has changed.

22. A program storage device readable by machine, tangibly embodying a program of instructions executable by the machine to perform method steps for executing a function within an icon area comprising a plurality of function areas forming a function group in a composite icon, each of the plurality of function areas being correlated to a function and being represented by an associated image, the method steps comprising:

detecting whether the pointing device is positioned over a function area in the function group;

displaying an associated image representing the function area in at least a part of the icon including the plurality of function areas if it is determined that the pointing device is positioned over the function area;

determining whether a user has selected the function area and executing a function correlated to the function area; and enabling selection of a new function area which was not included in the icon area before size of the icon area was changed by an operator, the new function area correlated to a function and being represented by an associated appearance image included in the icon area the size of which has changed.

23. The program storage device according to claim 22, the method further comprising the steps of:

determining whether the user has changed a size of the icon area;

changing the size of the icon area and the plurality of function areas within the icon area in response to the determination that the use has changed the size of the icon area; and enabling the user to select a function area of the plurality of function areas the size of which has changed for execution.

24. The program storage device according to claim 23, the method further comprising the steps of determining whether the change of the size of the icon area meets a predetermined condition;

displaying the new function area not displayed in the icon area before the size of the icon area was changed if the predetermined condition is met; and enabling the user to select the new function area displayed and executing the function correlated to the new function area.

25. The program storage device according to claim 22, the method further comprising the steps of:

determining whether the user has changed the function group comprising the plurality of function areas in the icon area to a new function group comprising a plurality of function areas, each of the plurality of function areas in the new function group being correlated to a function and being represented by an associated image;

detecting whether the pointing device is positioned over a function area in the new function group;

displaying an associated image representing the function area in at least a part of the icon including the plurality of function areas if it is determined that the pointing device is positioned over the function area of the new group; and determining whether a user has selected the function area and executing a function correlated to the function area.

* * * * *

UNITED STATES PATENT AND TRADEMARK OFFICE
CERTIFICATE OF CORRECTION

PATENT NO.   : 6,469,722 B1
DATED        : October 22, 2002
INVENTOR(S)  : Yohsuke Kinoe et al.

It is certified that error appears in the above-identified patent and that said Letters Patent is hereby corrected as shown below:

Column 6,
Line 4, "a-part" should read -- a part --
Line 51, after "device" delete "."
Line 56, delete 1st instance of "(a)"

Column 9,
Line 15, "program-comprising" should read -- program comprising --

Column 12,
Line 52, "I" should read -- 1 --

Column 21,
Line 5, "composite" should read -- Composite -- and begin a new paragraph Column 27,
Line 8, "fiction" should read -- function --

Column 28,
Line 50, "fiction" should read -- function --

Column 32,
Line 36, "comprising;" should read -- comprising: --

Column 33,
Line 9, after "executing" insert -- a --
Line 22, "tat" should read -- that --

Signed and Sealed this

Twenty-second Day of June, 2004

JON W. DUDAS
*Acting Director of the United States Patent and Trademark Office*